(12) United States Patent
Atluri et al.

(10) Patent No.: US 9,156,359 B2
(45) Date of Patent: Oct. 13, 2015

(54) METHODS AND VEHICLE SYSTEMS FOR SELECTIVELY USING ENERGY OBTAINED FROM A SOLAR SUBSYSTEM

(71) Applicant: GM Global Technology Operations LLC, Detroit, MI (US)

(72) Inventors: Venkata Prasad Atluri, Ann Arbor, MI (US); Michael Gerard Rubbo, Holly, MI (US); Larry D. Laws, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 370 days.

(21) Appl. No.: 13/630,150

(22) Filed: Sep. 28, 2012

(65) Prior Publication Data

US 2014/0095018 A1    Apr. 3, 2014

(51) Int. Cl.
*B60L 8/00* (2006.01)
*B60L 1/00* (2006.01)
*G05B 11/01* (2006.01)

(52) U.S. Cl.
CPC . *B60L 8/003* (2013.01); *B60L 1/00* (2013.01); *B60L 2200/26* (2013.01); *G05B 11/01* (2013.01)

(58) Field of Classification Search
CPC ....... B60L 1/00; B60L 8/003; B60L 2200/26; G05B 11/01
USPC ................................ 701/22, 36, 123
See application file for complete search history.

(56) References Cited

U.S. PATENT DOCUMENTS

| | | | |
|---|---|---|---|
| 4,661,758 A | 4/1987 | Whittaker | |
| 5,602,457 A * | 2/1997 | Anderson et al. | 320/102 |
| 6,768,047 B2 | 7/2004 | Chang et al. | |
| 7,834,580 B2 | 11/2010 | Haines | |
| 2008/0143292 A1* | 6/2008 | Ward | 320/101 |
| 2009/0001926 A1* | 1/2009 | Sato | 320/102 |
| 2009/0079384 A1* | 3/2009 | Harris | 320/102 |
| 2010/0142194 A1 | 6/2010 | Masuda | |
| 2011/0301790 A1* | 12/2011 | Atluri et al. | 701/22 |
| 2012/0074892 A1* | 3/2012 | Wu et al. | 320/101 |
| 2012/0112684 A1* | 5/2012 | Xu et al. | 320/101 |

(Continued)

FOREIGN PATENT DOCUMENTS

| | | |
|---|---|---|
| EP | 1058367 A2 | 12/2000 |
| JP | 8251711 A | 9/1996 |

(Continued)

OTHER PUBLICATIONS

Casacca, M.A. et al. "Lead Acid Battery Storage Configurations for Improved Available Capacity", IEEE, vol. II, Issue 1, Mar. (1996).

*Primary Examiner* — Helal A Algahaim
*Assistant Examiner* — Dale W Hilgendorf
(74) *Attorney, Agent, or Firm* — Mickki D. Murray; Parks Wood LLC

(57) ABSTRACT

The present disclosure relates to an automobile electrical system including a solar subsystem. Components collect and store solar energy in an advanced energy storage subsystem including a base portion and, in some embodiments, a solar-energy buffer. The components use the solar energy selectively to meet vehicle loads, including selectively using one or more of: energy obtained directly from the solar subsystem; energy from the advanced energy storage system; and energy from a high-voltage energy converter such as an alternator or accessory power module.

20 Claims, 11 Drawing Sheets

(56) References Cited

U.S. PATENT DOCUMENTS

2012/0187684 A1* 7/2012 Kawas et al. ............... 290/44
2012/0271723 A1* 10/2012 Penilla et al. ............... 705/16

FOREIGN PATENT DOCUMENTS

JP 2004221521 A 8/2004
KR 20080010647 1/2008

* cited by examiner

METHODS AND VEHICLE SYSTEMS FOR SELECTIVELY USING ENERGY OBTAINED FROM A SOLAR SUBSYSTEM

TECHNICAL FIELD

The present disclosure relates generally to methods and vehicle systems for using energy obtained from a solar subsystem and, more particularly, for storing the energy in a solar buffer of an advanced energy storage subsystem and meeting electrical needs of the vehicle selectively using energy received from the solar subsystem, the solar buffer, and/or a high-voltage energy converter.

BACKGROUND

In most conventional automobiles, electricity for operating various vehicle electrical components, such as the vehicle lights and HVAC, is produced by an alternator. Typically, work done by an internal combustion engine (ICE) is converted, by the alternator, to an alternating-current (AC). An AC/DC converter converts the AC current to DC and passes the resulting current to a rechargeable low-voltage battery—i.e., the conventional 12-Volt (12V) battery. Because too much or too little voltage can damage or weaken the battery, a voltage regulator intermediates between the alternator and the battery and ensures that the appropriate voltage is introduced to the battery.

The efficiency with which automobiles generate and use power has increased considerably in the past few decades and efforts to further improve power efficiency and related benefits to mileage continue. Developments include use of a basic regulated voltage control, improved electric and hybrid vehicles, and use of solar energy.

Basic regulated voltage control (or, basic RVC) systems were introduced in response to a determination that the low-voltage battery need not always be kept fully charged during vehicle operation—i.e., at a 100% state-of-charge (SOC). It was noticed that maintaining a SOC at or above about 80% was sufficient for vehicle operation.

Basic RVC controls electrical system voltage by regulating output voltage of a generator or alternator. The control is based on an estimated battery temperature, the battery SOC, and present electrical needs of the vehicle. While earlier vehicles maintained a generally constant system voltage at a maximum level, e.g., 13V or 14V depending on the low-voltage battery, vehicles having the basic RVC in connection with the same 12V power source were able to, based on vehicle conditions at the time, dynamically fluctuate the system voltage, e.g., between about 12V and the maximum (13V or 14V in the examples). This ability to fluctuate system voltage resulted in a lower average voltage per trip with lowered energy consumption.

With basic RVC, the battery charge, through the manipulation of system voltage, can be selectively lowered to values between 100% SOC and about 80% SOC. In terms of voltages, 80% SOC for a typical flooded, lead-acid 12V battery, would equate to about 12.8V (80% of the range between a 0% SOC value of 12V and a 100% SOC value of 13V).

Just the basic RVC usage improved fuel economy, extended battery life, extended lamp life, and extended switch life. Further improvements are now possible according to the teachings of the present disclosure, including an augmented, more-aggressive, RVC model selectively using solar energy that is stored in an augmented, low-voltage, energy source or received directly from a solar subsystem.

In current automobiles equipped with a solar subsystem, solar energy is used in various ways. There are numerous shortcomings to using solar energy in these ways. The technology of the present disclosure overcomes these shortcomings, resulting in improved power efficiency and related vehicle-mileage characteristics.

SUMMARY

The present disclosure relates to a method, and a computer-readable storage medium comprising computer-executable instructions that, when executed by a processor, cause the processor to perform operations, for controlling a vehicle electrical system including (a) a solar subsystem and (b) a low-voltage advanced energy storage subsystem (AESS) having (i) a base portion for storing and providing base power to satisfy electrical loads of the vehicle and (ii) a solar buffer for storing and providing supplemental power to satisfy the electrical loads, comprising determining whether an amount of solar power, being output by the solar subsystem, is greater than a predetermined solar-power value. The method and operations of the algorithm further include operating, if the solar power is greater than the predetermined solar-power value and the vehicle is turned on, the vehicle electrical system in a light-drive mode, including using the solar power selectively to charge the AESS to a full level of the base portion, maintain a charge of the AESS at, the full level of the base portion, or satisfy electrical loads of the vehicle.

The method and operations of the algorithm further include operating, if the solar power is not greater than the predetermined solar-power value and the vehicle is turned on, the vehicle electrical system in a dark-drive mode, including using the solar power selectively to charge the AESS to, or maintain a charge of the AESS at, a full level of the base portion. The method and operations of the algorithm also include operating, if the solar power is greater than the predetermined solar-power value and the vehicle is turned off, the vehicle electrical system in a light-rest mode, including using the solar power selectively to charge the AESS to, or maintain a charge of the AESS above, a full level of the base portion and the solar buffer. The method and operations of the algorithm further include operating, if the solar power is not greater than the predetermined solar-power value and the vehicle is turned off, the vehicle electrical system in a dark-rest mode.

In some embodiments, the method and algorithm include, as part of operating the electrical system in the light-drive mode, including using the solar power selectively to charge the AESS to, or maintain the charge of the AESS at, the full level of the base portion, determining, in a second determination operation, an appropriate output voltage for a solar DC-to-DC convertor (solar DDC) of the electrical system to be greater than a present setting of a high-voltage energy converter (HVEC) of the electrical system, initiating setting of the solar DDC to effect output from the solar DDC of the output voltage determined to the AESS, and determining whether a state-of charge (SOC) of the AESS is less than the full level of the base portion. In some embodiments, the method and algorithm further include setting, if it is determined that the AESS SOC is not less than the full level of the base portion, the HVEC of the electrical system to a first voltage set point causing (A) satisfaction of vehicle electrical loads with power from the AESS and/or (B) maintenance of the AESS SOC at about the full level of the base portion, and, if it is determined that the AESS SOC is less than the full level of the base portion, (i) setting the HVEC of the electrical system to a second voltage set point causing charging of the AESS via the HVEC; and (ii) returning to the first determination operation.

In another aspect, the present disclosure relates to a vehicle system including a low-voltage advanced energy storage subsystem (AESS). The AESS includes a base portion that, when fully charged, has electrical capacity sufficient alone to satisfy all low-voltage electrical loads of the vehicle. The AESS also includes a solar buffer as an additional portion of the AESS to provide additional capacity for storing power at the AESS as supplemental power in addition to power stored at the base portion of the AESS. In some embodiments of this aspect, in operation of the system: (a) power is only provided to the solar buffer if the base portion is full and (b) power is only taken from the base portion if the solar buffer is depleted. The system also includes a solar subsystem, connected electrically to the AESS and configured to generate the solar power using solar energy, and a high-voltage energy converter (HVEC), connected electrically to a high-voltage energy source (HVES) and configured to generate high-voltage power which is subsequently converted to a converted low-voltage power for use in the system.

In still another aspect, the present disclosure relates to a method, and algorithm embodied in a computer-readable storage medium comprising computer-executable instructions that, when executed by a processor, cause the processor to perform operations, for controlling a vehicle electrical system including (a) a solar subsystem and (b) a low-voltage advanced energy storage subsystem (AESS) for storing and providing base power to satisfy electrical loads of the vehicle and, comprising various operations. The operations include determining, in a first determination operation, whether an amount of solar power, being output by the solar subsystem, is greater than a predetermined solar-power value. The operations also include, if the amount of solar power is not greater than the predetermined solar-power value setting a solar DC-to-DC convertor (solar DDC) to a sleep mode returning to the first determining operation. The operations further include affecting, if the amount of solar power is greater than the predetermined solar-power value and the vehicle is not in the drive mode, the electrical system to maintain the AESS at full state-of-charge (SOC) by causing a maintenance charging current is provided to the AESS from the solar DDC. The operations also include initiating, if the amount of solar power is greater than the predetermined solar-power value and the vehicle is in a drive mode, a light-drive mode including (i) determining, in a second determination operation, an appropriate output voltage for the solar DDC of the electrical system to be greater than a present setting of a high-voltage energy converter (HVEC) of the electrical system, and (ii) initiating setting of the solar DDC to effect output from the solar DDC of the output voltage determined to the AESS.

Other aspects of the present technology will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

OVERVIEW OF THE DISCLOSURE

In various embodiments, the present disclosure describes components of an automobile electrical system including a solar subsystem. In operation, the components collect and store solar energy in an advanced energy storage subsystem, and in some embodiments in a solar-energy buffer thereof. The components use the solar energy selectively to meet vehicle loads, including selectively using one or more of: (i) energy obtained directly from the solar subsystem, (ii) energy from the advanced energy storage system (e.g., the solar buffer of the advanced energy storage subsystem), and (iii) energy from a high-voltage energy converter such as an alternator or accessory power module.

While the present technology is described primarily in connection with automobiles to simplify the disclosure, the present technology is not limited to automobiles. It will be appreciated that the technology may be used in connection with other types of vehicles, such as aircraft, watercraft, railway vehicles, and others.

System Components

Figure 1:
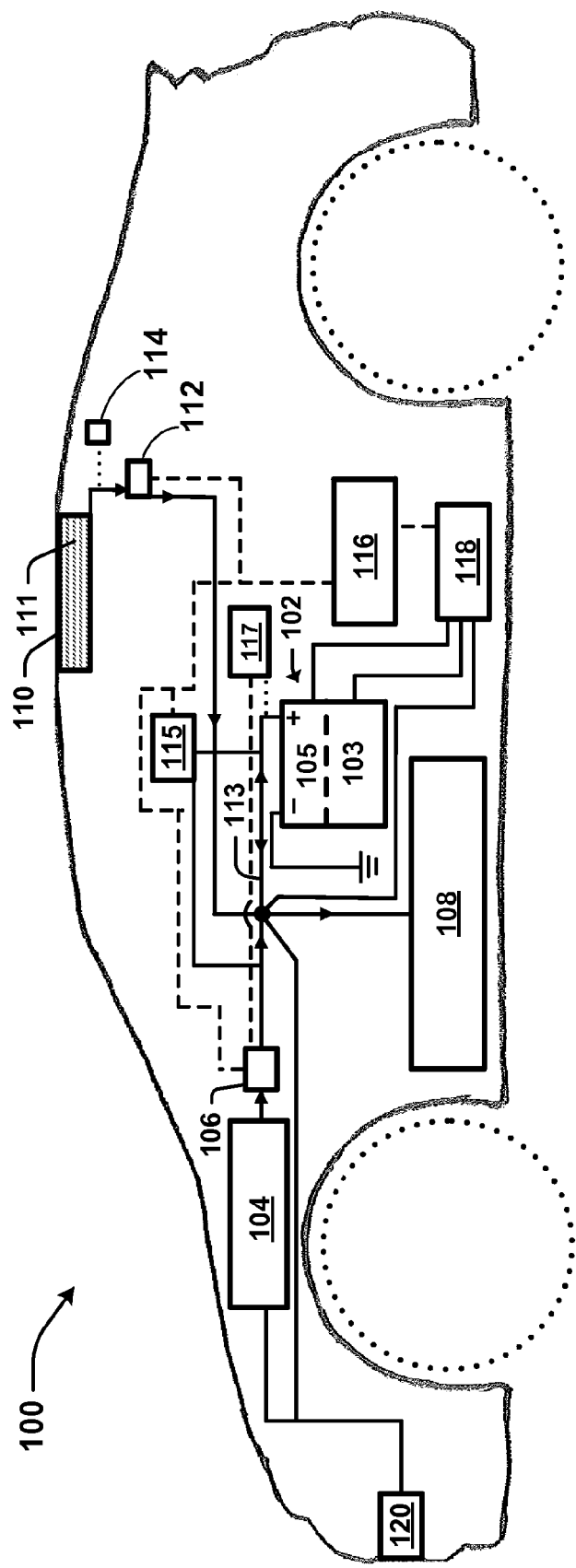
FIG. 1 illustrates a vehicle system according to an embodiment of the present technology.

Now turning to the figures, and more particularly to the first figure, FIG. 1 illustrates a schematic diagram of a vehicle system 100 according to the present technology. The system 100 includes an advanced energy storage subsystem 102 (or, AESS). The advanced energy storage subsystem 102 can also be referred to by other names indicative of its function, such as an advanced low-voltage energy source or advanced 12V-energy source. For some embodiments, the advanced nature of the AESS 102 lies at least in part on the subsystem 102 being a novel, augmented, version of a conventional rechargeable low-voltage battery.

The advanced version can be augmented according to the present technology. More particularly, the advanced energy storage subsystem 102 comprises a base, reservoir or portion 103 and in some embodiments includes an advanced, additional, extra, or supplementary reservoir or portion 105. The supplementary portion 105 provides what can be referred to as a solar reservoir or buffer. In some embodiments, the solar buffer 105 is optional or not present in the system 100.

As with each feature described herein, the solar buffer can be referred to by other names. The buffer 105 can be referred to instead as a solar auxiliary power unit (solar APU) buffer, for instance.

The function within the vehicle system 100 and importance of the advanced energy storage subsystem 102 to the present technology are described further below.

The advanced energy storage subsystem 102 is connected to a primary, high-voltage, vehicle energy source 104 (or, HVES). In various embodiments, the primary high-voltage vehicle energy source 104 includes an engine, such as an internal combustion engine (ICE), a high-voltage (HV) battery, or a fuel cell.

For embodiments in which the HVES 104 includes an engine, the engine uses a fuel such as gasoline to produce output work, such as rotation of a crankshaft or of an engine belt. The system 100 further includes an onboard high-voltage-to-low-voltage energy converter, or simply high-voltage energy converter 106 (HVEC). In at least some of the embodiments in which the primary high-voltage vehicle energy source 104 includes an engine, the high-voltage energy converter 106 includes an alternator. When the HVES 104 is an engine, the high-voltage energy converter 106 converts the output work of the engine to electric power. In cases in which the converter 106 includes an alternator, the alternator generates a high-voltage alternating-current (AC) of electricity using the output work of the engine. An AC/DC convertor converts the high-voltage AC to a relatively-low direct current (DC) for storing the power in the low-voltage advanced energy storage subsystem 102 and/or for direct use to meet needs of an electrical subsystem load 108 of the vehicle.

Example loads 108 include propulsion-related loads such as propulsion control devices, engine control devices, propulsion cooling devices, non-propulsion-related loads such as chassis control devices, dynamic braking devices, and HVAC controls, and general electrical power loads such as high-voltage and low-voltage power cooling, high-voltage energy management, and low-voltage power generation.

For embodiments in which the HVES 104 includes a HV battery or a fuel cell, the high-voltage energy converter 106 includes an accessory power module (APM). The APM converts high-voltage output of the HV battery or fuel cell to a relatively-low voltage for storage in the advanced energy storage subsystem 102 and/or for using directly to meet the vehicle electrical loads 108. Use and control of the high-voltage energy 106, be it in the way of an alternator, accessory power module, or the like, is described further below.

With continued reference to FIG. 1, the vehicle system 100 further includes a solar subsystem 110. The solar subsystem 110 may also be referred to as a photovoltaic (PV) subsystem or module, a solar auxiliary power unit (solar APU), or the like. The subsystem 110 includes a solar or PV array or panel 111. The array 111 can have various sizes, shapes, and materials without departing from the scope of the present technology. In one embodiment, the array 111 covers an area of about 1 square meter (1 m$^2$).

The solar subsystem 110 generates electricity using light energy—more particularly, for example, converting solar energy to DC output power. In some embodiments, the vehicle system 100 includes a DC-to-DC converter 112, which can also be referred to as a solar DC/DC converter, a solar DDC, an SDDC, just SDC, or the like. The SDC 112 can be, for example, a buck device for use in selectively stepping up, or boosting, output of the solar array. The solar DC 112 in some implementations also provides a stepping down, or bucking, function, and so can be referred to as a step-up/step-down, or buck/boost, device. In a contemplated embodiment, the system 100 includes separate buck and boost devices for respectively stepping down and stepping up output of the solar panel as needed.

The solar DDC 112 may be a part of the solar subsystem 110 or separate from and in communication with the solar subsystem 110. Use and control of the solar DDC 112 is described further below.

The vehicle system 100 also includes a solar-subsystem measuring device or element 114, such as a current measuring element, for measuring output of the solar array such as current. The measuring element 114 shown in FIG. 1 can represent more than one distinct measuring element. The one or more measuring elements 114 measure more than one characteristic of solar-array output, such as current and voltage.

The vehicle system 100 and balance of the vehicle includes many other sensors (e.g., battery-current sensor) for determining current vehicle states, such as state of charge, charging, or discharging of the low-voltage AESS 102, states of the high-voltage energy converter 106 or vehicle loads 108, and the like. For simplified disclosure, the measuring element 114 illustrated schematically is considered to represent any and all such vehicle sensors, though not every connection is shown expressly between the measuring element 114 and respective vehicle components.

In one embodiment of the present technology, the system 100, in addition to any boosting and/or converting features provided by the solar DDC 112, includes an additional boost/converter device 115. The device 115 is shown in further, exemplary detail in FIG. 5, and described below in connection with FIG. 5.

The additional device 115 can be configured, positioned, and connected to electronically switch between the HVEC 106, the AESS 102, and the subsystem loads 108. The device 115 thus can, not only isolate the AESS 102 from being charged by the HVEC 106, but provide electrical energy at night to either the entire elect subsystem 108 or to selective loads thereof, such as the headlights or the fuel pump. The device 115 could be useful for night driving, when a higher system voltage is needed to run vehicle headlights at maximum brightness, or during high engine load conditions which might require a higher voltage to the fuel pump for delivering a greater fuel flow rate. The additional boost/converter device 115 would operate toward meeting those higher voltage needs.

It is also possible to use energy from the PV array 111 to run any vehicle loads 108, such as heated seats, cabin blower, oxygen sensor heaters, rear defogger, or heated mirrors. In some embodiments, such loads are activated by functions preprogrammed by the user via a user interface, e.g., vehicle-user interface or computer communicating directly or indirectly with the vehicle. In some embodiments, such loads are activated by intelligent software that decides when to power these loads either by anticipating customer needs or deciding to use the energy when the AESS 102 is at 100% SOC, thus having excess energy.

This additional use of PV current can be made even when the vehicle system 100 is in an accessory mode, or run mode, without the engine running. Any leftover energy from the panel, after such loads are satisfied, will be used to charge the AESS 102. In operation, by setting the DC/DC converter 112 to a level higher than a set point of the AESS 102, energy needed to satisfy the vehicle loads will advantageously come from the solar panel 111 and the DC/DC converter 112, first, and only after the PV panel reaches its maximum output would the system then draw from the AESS 102.

With further reference to FIG. 1, the vehicle system 100 includes an onboard computer subsystem 116. The onboard computer subsystem is communicatively connected to the high-voltage energy converter 106 and to the solar DDC 112 for selectively controlling one or both converters 106, 112. As with all illustrated components of the system 100, although a single element 116 is shown in the figure to represent the component, the element 116 can represent more than one component. Thus, while a single onboard computer subsystem 116 is illustrated for ease of description, it will be appreciated that the vehicle system 100 can include two or more onboard computer subsystems for performing the functions disclosed herein in connection with the onboard computer subsystem 116. Further, any two or more processing components described herein can be implemented in a single component. For instance, the illustrated subsystem 116 and the solar DDC 112 (or SDC) can be embodied in a single computing device. Likewise, any single processing component described herein can be implemented as two or more separate, connected or unconnected, processing components. References herein to processor performed by any one or group of processing devices can thus in various embodiments be performed at any other device or group of the devices.

The at least one onboard computer subsystem 116 can be operatively connected to the high-voltage energy converter 106 and to the solar DC/DC energy converter 112 by wire and/or wirelessly.

As describe more below, the computer subsystem 116 includes one or more software modules of computer-executable code or instructions, executable by one or more processors, causing the processor(s) to control vehicle functions including functions of the high-voltage energy converter 106 and the solar DDC 112.

The code includes a type of regulated voltage control (RVC) logic, which may be referred to as an aggressive or augmented RVC subsystem, or ARVC, of the present system 100. The augmented RVC subsystem, which performs what can be referred to as aggressive or augmented smart charging and discharging (ASCD), is described in further detail below.

The code also includes instructions for controlling the solar DDC 112. This code can be referred to as solar-output instructions (or, SOI). The SOI are, in one embodiment, a part of the augmented RVC, and separate in another embodiment. In one embodiment, the SOI is a part of the solar DDC 112.

Because operation of the augmented RVC subsystem depends on varying conditions, the subsystem can also be referred to as dynamic, adapting, learning, etc. As described more below, the variables can include: (i) AESS temperature (e.g., the temperature at, adjacent, or near the low-voltage AESS 102), (ii) whether the vehicle is being operated at night (e.g., in the dark), and (iii) a level of the solar buffer 105. Because the augmented RVC subsystem affects system voltage, its function can be referred to as a voltage valve-control, or simply voltage control.

Vehicle voltage level is controlled by an output setting of the high-voltage energy converter 106 and/or an output setting of the solar DC/DC convertor 112. One or more of such output settings can be controlled by the augmented RVC subsystem. Based on the setting(s), vehicle loads 108 can be satisfied selectively using current from any of: (i) the low-voltage advanced energy storage subsystem 102; (ii) the high-voltage energy converter 106; (iii) the solar subsystem 110, or (iv) any combination of the three, including from two, or up to all three, of these simultaneously, as described more herein.

As an example, in one embodiment, the provision of energy to satisfy vehicle electrical loads 108 is shared between the AESS 102, including the solar buffer 105, and the HVEC 106. As the solar buffer 105 is depleted, such as to satisfy vehicle electrical loads 108, the HVEC 106 will slowly begin to supply energy to the loads 108 along with the solar buffer 105 continuing to supply energy to the loads 108. The AESS 102 will supply less and less energy to satisfy the loads 108 as the solar buffer 105 is depleted to the full level of the base portion 103, and the HVEC 106 will supply more and more of the energy to satisfy the loads 108, until the level of the base portion 103 is reached, whereby the AESS 102 reaches an equilibrium state in which generally no energy is going into nor coming out of the AESS 102 and the HVEC 106 will begin alone satisfying all loads 108 with energy.

The code of the augmented RVC subsystem and/or the processor executing the code can be positioned in any of various parts of the vehicle without departing from the scope of the present technology. As an example, in one embodiment, the augmented RVC subsystem is integrated into a body or engine control module (BCM or ECM) of the vehicle. This arrangement may be referred to as an integration model.

In another embodiment, the augmented RVC subsystem is contained in a vehicle module distinct from the BCM and ECM. This arrangement may be referred to as a stand-alone model. In one embodiment, the distinct vehicle module according to the stand-alone module may be dedicated to the aggressive RVC control. In another embodiment, the distinct vehicle module performs aggressive RVC control and other functions.

In one embodiment, the distinct vehicle module according to the stand-alone model includes one or more sensors (e.g., low-voltage battery current sensor), and is in operative communication with the low-voltage subsystem 102 and the high-voltage energy converter 106, allowing it to determine itself what instruction signals to send to the high-voltage energy converter 106.

In the figures, to accommodate the possibility of the integration and stand-alone models, the augmented RVC subsystem is identified by reference numeral 117 in two places. In FIG. 1, the augmented RVC subsystem 117 is shown as a distinct vehicle control module according to the stand-alone model.

Figure 2:
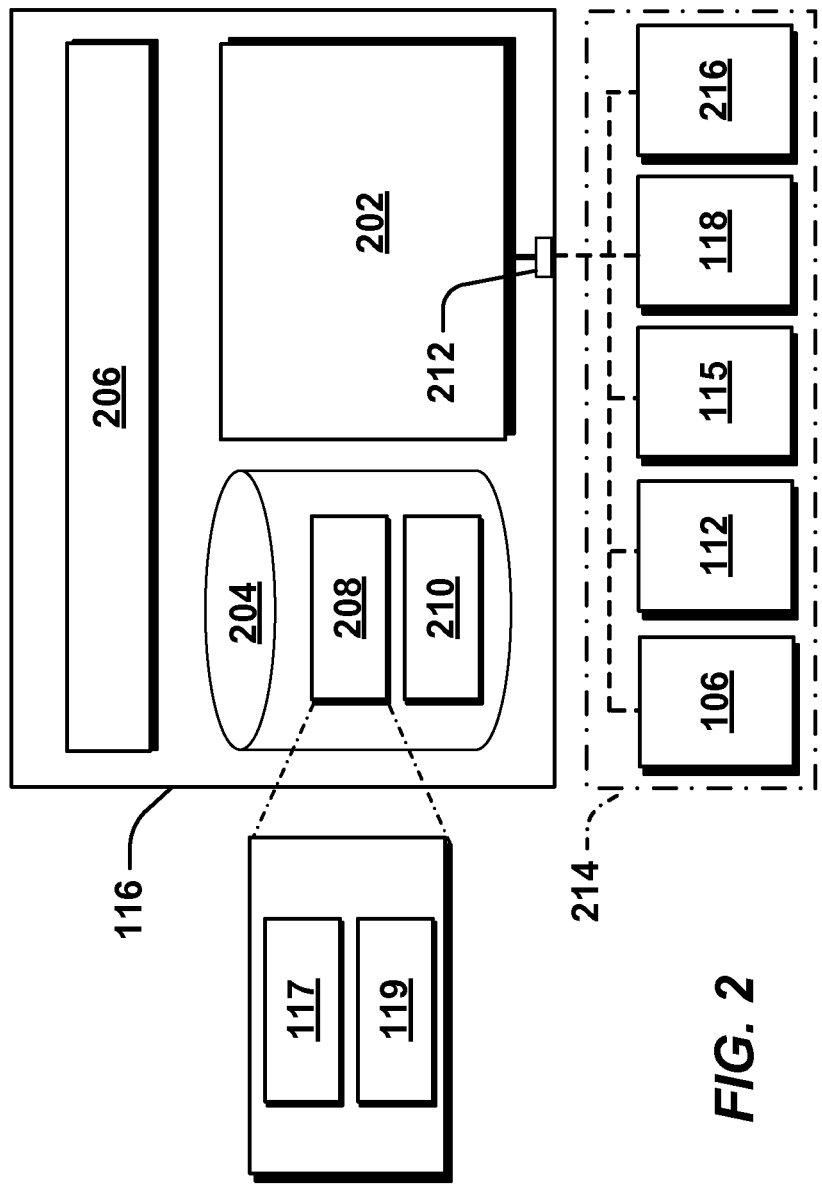
FIG. 2 illustrates a computer subsystem of the vehicle according to an embodiment of the present technology.

In FIG. 2, the augmented RVC subsystem 117 is shown integrated into a primary control module of the vehicle, such as a BCM or ECM. While details of the stand-alone subsystem 117 of FIG. 1 are not shown, it will be appreciated that the illustration is considered to show, constructively, components needed for its operation, including computer-readable instructions, a processor, and possibly separate supporting data, such as shown in FIG. 2, as well as one or more sensors (e.g., 12V battery current sensor) as described above. While the integrated subsystem 117 is shown in FIG. 2 as a part of the instructions 208, it will be appreciated that components of the system 100 needed for performance of the augmented RVC subsystem 117 include other components (e.g., processor, etc.) and the augmented RVC subsystem 117 is considered to be shown constructively as including these needed components.

The system 100 can be operated selectively in a normal mode or one or more other modes. Changing the system 100 from one mode to another is accomplished by aggressively controlling the high-voltage energy converter 106 and/or the solar DC/DC convertor 112 so that each converter 106, 112 functions according to normal or default operations. The aggressive control of the high-voltage energy converter 106 is accomplished using the augmented RVC subsystem 117. As provided, the control of the solar DDC 112 is accomplished using solar-output instructions (SOI), which, in one embodiment, are a part of the augmented RVC and, in one embodiment, is a part of the solar DDC 112.

Make-up and operation of the at least one onboard computer subsystem 116 is described further below in connection with FIGS. 2-5.

As provided, while single elements are shown in FIG. 1, each element can represent more than one individual component configured for performing the functions of the illustrated element. Similarly, it is within the scope of the present disclosure that any two or more elements shown or described separately can be combined into a lesser number of elements. For instance, as provided above, the solar DDC 112 and the solar subsystem 110 can be combined or separate connected elements. As another example, the illustrated measuring element 114 can include one or more elements, which can be combined with or separate and connected to the solar subsystem 110.

Further regarding interpretation of the present disclosure, the size, shape, and locations of elements are provided schematically for simplifying the disclosure and do not control or limit the actual size, shape, and location of the elements. Likewise, connections between illustrated elements in FIG. 1 are not limited to those shown. While a single input/output line 113 is shown connected to the advanced energy storage subsystem 102, the system 100 can include multiple input and/or output lines, such as separate lines from the HVES/HVEC 104/106, from the solar subsystem 110, and/or to the vehicle loads 108.

Advanced Energy Storage System

The augmented energy storage system (AESS) is described here in more detail.

In one embodiment, the base portion 103 of the advanced energy storage subsystem 102 has a capacity equal to the low-voltage battery of conventional like-type vehicle (e.g., to that of the conventional 12V battery in the case of most automobiles). The solar buffer 105, on the other hand, includes a supplementing capacity. The amount of supplementing capacity can be established by a designer of the system 100 to any desired workable value to meet expected needs of the system 100.

In another embodiment, the AESS 102 does not have a solar buffer 105. In this case, the solar subsystem 110 is used primarily when the vehicle is being driven to provide electrical energy for the electrical subsystem loads 108 and, secondarily, to trickle charge the AESS 102 when the vehicle is off.

The capacity of low-voltage batteries can be measured in ampere-hours (Ah). The total capacity for most modern automotive 12V batteries is typically 60 Ah. The base portion 103 of the advanced energy storage subsystem could thus have a 60 Ah capacity. Other base-portion 103 capacities may define the base portion 103, such as 50 Ah, 65 Ah, 70 Ah, a value below 50 Ah or above 70 Ah, or a value between any pair of these values, without departing from the scope of the present technology. The disclosure describes mostly a 60 Ah base capacity herein by way of primary example considering that the entire capacity of conventional 12V car batteries is 60 Ah.

In one embodiment, the designer determines rating features (e.g., ampere-hours and voltage) of the base portion 103 for a certain vehicle (having its certain requirements including low-voltage (e.g., 12V) electrical loads 108) to be the rating features that the same certain vehicle (having the same certain requirements) would require of its low-voltage battery. The requirement can be based on federal regulations. As an example, if a version of a vehicle, sans the present solar-related characteristics (solar subsystem, augmented RVC, solar buffer, etc.) would require a 12.5V @ 60 Ah rated low-voltage battery, then those rating features are considered as the baseline rating features in designing the advanced energy storage subsystem 102, according to the present technology, for the same vehicle having the present solar properties. Thus, for that same vehicle, modified according to the present teachings, the advanced energy storage subsystem 102 would be a 12.5V system comprising a base portion 103 having a capacity of 60 Ah.

The additional solar buffer 105 has a capacity corresponding to a predetermined multiple, or percentage of the capacity of the base portion 103 and the capacity of the solar buffer 105. The relationship between the two portions 103, 105 could also be represented as a ratio. The multiple or ratio defines the relationship between capacities of the base portion 103 and the supplemental portion 105 and can be referred to by names such as base-portion-to-solar-buffer multiple, base-portion-to-solar-buffer percentage, solar buffer/base portion ratio, or the like. In one embodiment, the supplementing capacity provided by the solar buffer 105 is about 0.66 (multiple)—i.e., the solar buffer 105 has a capacity that is 66% (percentage), or 2/3 (ratio), of the capacity of the base portion 103. For cases in which the base portion 103 has a capacity, or rating, of about 60 Ah, the corresponding solar buffer 105 would have a capacity, or rating, of about 40 Ah in this embodiment.

From an energy perspective, assuming the 12V application, a 60 Ah-rated base portion 103 would equate to 720 watt hours of energy (60 Ah·12V). A 40 Ah-rated base portion 103 would equate to 480 watt hours of energy 40 Ah·12V. The energy of the entire advanced energy storage system 102 would in both instances total 1200 watt hours—i.e., (60 Ah+40 Ah)·12V, or 720 watt hours+480 watt hours.

In other embodiments, the supplementing capacity provided by the solar buffer 105 is greater than or less than about 66% of the capacity of the base portion 103. In one embodiment, the multiple is between about 50% and about 80% of the capacity of the base portion 103. For instance, the supplementing capacity can be about 50%, 55%, 60%, 65%, 70%, 75%, 80%, or any value there-between, of the capacity of the base portion 103. In one embodiment, the supplementing capacity is below 50% or greater than 80%, and could be over 100%, of the capacity of the base portion 103.

It is preferred in one implementation of the present technology that the advanced energy storage subsystem 102 not include a physical separation between the base portion 103 and the solar buffer 105. In this case, using the 60 Ah/40 Ah base/buffer example described above, the resulting advanced energy storage subsystem 102 would include structure enabling the 100 Ah capacity without delineating between the constituent 60 Ah/40 Ah portions 103/105 making up the total.

In a contemplated embodiment, the advanced energy storage subsystem 102 includes at least a partial separation delineating the constituent portions 103/105. The separation can be considered illustrated schematically in FIG. 1 by the dashed line between the two portions 103, 105 of the subsystem 102. As an example, the advanced energy storage subsystem 102 could include two sub-batteries connected, such as in series or parallel. As a specific example, the example 12V @ 100 Ah rated subsystem 102 can be achieved by connecting in parallel a 12V @ 60 Ah base sub-battery 103 to a 12V @40 A solar-buffer sub-battery 105. In a particular case, the two portions 103, 105 and/or the separation between them is configured so that, in drawing energy from the advanced energy storage subsystem 102, energy must be pulled first from any capacity present at the time in the solar buffer 105 before energy can be pulled from the base portion 103.

In further regards to embodiments having a physical separation between the two portions 103, 105, the system can include appropriate switching electronics, such as in connection with a solar-buffer sub-battery 105, affecting the addition to and/or use of energy from, the solar-buffer sub-battery 105 and the other, base, sub-battery 103. For example, the switching electronics can control the separation so that energy could be added to or used from only one battery in select circumstances (e.g., using energy from the base sub-battery 103 only if the solar-buffer sub-battery 105 is depleted to a certain level) or so that energy could be added to or used selectively from either battery based on the circumstances. Such switching electronics could be controlled and/or performed by an already-described vehicle component or a vehicle component additional to those described above. The component can include, e.g., a power switch or switcher. The switching component is referenced schematically in FIG. 1 by numeral 118.

Figure 10:
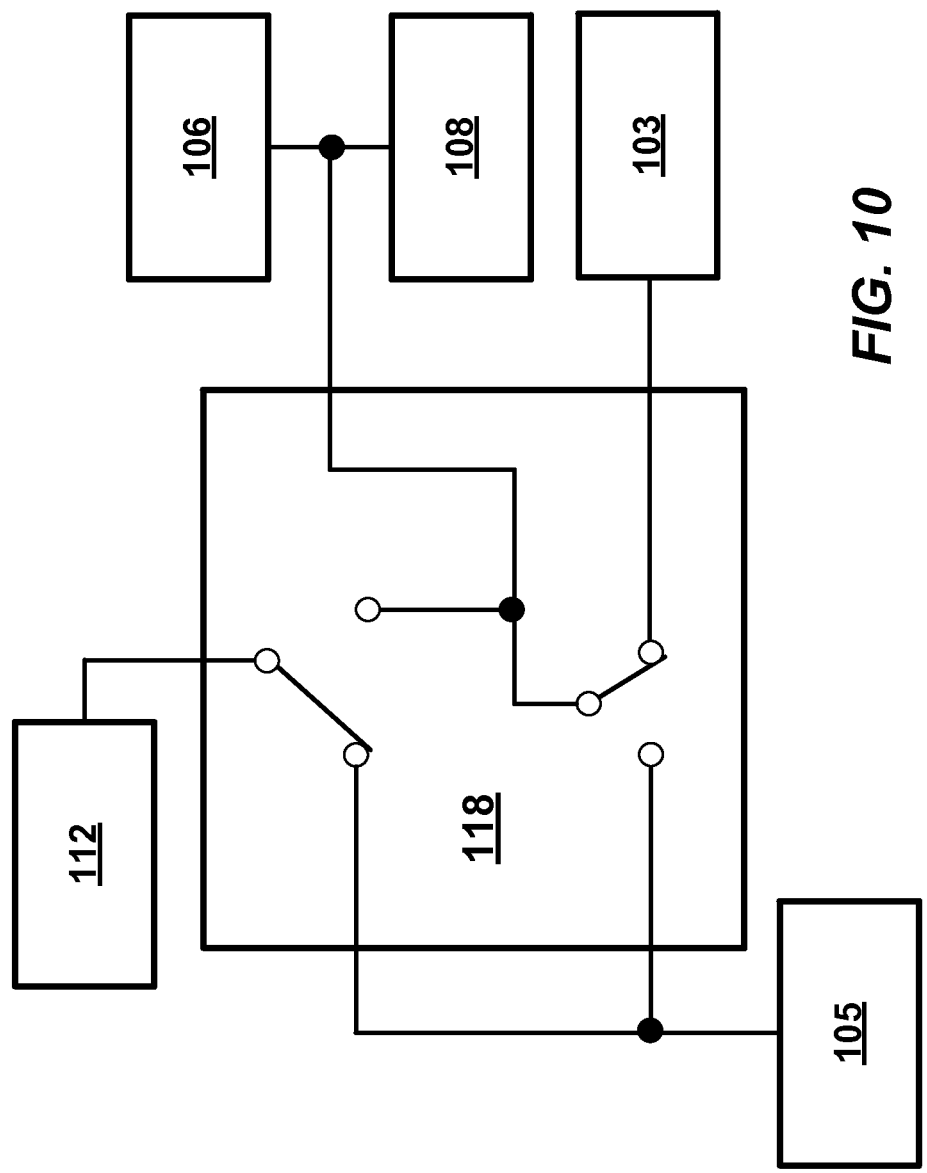
FIG. 10 shows a switching component of the vehicle system of FIG. 1.

The switching component 118 is shown schematically in more detail in FIG. 10, including with connections to other system 100 components. The switch 118 status shown in FIG. 10 represents an exemplary embodiment in which the vehicle is turned off and the solar buffer 105, of the AESS 102, is being charged with power from the solar sub-system via the DC-to-DC converter (DDC) 112. In this state, the base portion 103, of the AESS 102, maintains vehicle-off loads (e.g., vehicle clock, security system, etc.) of the vehicle loads 108. It should be appreciated that each switch of the component 118—a first switch and a second switch being shown by way of example in FIG. 10—can be a relay, such as an electromechanical relay, or an electronic device, such as a transistor. Each switch can be operated independently and so, in the two-switch example illustrated, there are four different connection configurations, or settings for the switching component 118.

Further regarding embodiments having a physical separation between the two portions 103, 105, in a particular embodiment, the switch 118 has the capability of switching the output of the DC/DC Converter 112 to provide energy to either the subsystem loads 108, the base sub-battery 103, or the solar-buffer sub-battery 105, or any combination thereof. In addition, a boost converter 115 could be integrated into the switch 118 to provide elevated system voltages to either all or any of the subsystem loads 108 or to selective other loads within the electrical system.

The advanced energy storage subsystem 102 can be charged by the solar subsystem 110 while the vehicle is driving or parked, and whether the vehicle is turned on or off. While the vehicle is on, the AESS 102 can be charged by the solar subsystem 110 and/or the high-voltage energy converter (HVEC) 106. In one embodiment, when the AESS 102 is below the baseline capacity of the base portion 105, any charging of the AESS 102, whether from the solar subsystem 110 or HVEC 106, operates to charge the base portion 103 until it reaches its maximum capacity. In this case, if the base portion 103 is charged to capacity, any charging of the AESS 102, charges the solar buffer 105 until it, and thereby the entire AESS 102, reaches its maximum capacity.

The referenced charging of the AESS 102 can come from one or more of a variety of sources depending on the embodiment implemented and current vehicle conditions. Example charging sources for the AESS 102 include the solar subsystem 110, the HVEC 106, and, for electric vehicles, a vehicle charging socket 120 selectively connected to an external charging station or charger (e.g., private or public utility wall). Typically, an electric vehicle is charged by connecting the vehicle charging socket 120 to a 110V AC wall socket or 220V AC charger, which not only supplies charging current for the long-range, high voltage (e.g., 350V) energy source 104 and to the 12V battery, but can also provide 12V energy to maintain the vehicle computer systems (e.g., onboard computer subsystem 116) responsible for the charging process.

On discharge, current will be pulled first from any available capacity of the solar buffer 105 of the AESS 102. If the solar buffer 105 is depleted, then needed current will be drawn from the base portion 103 of the AESS 102. As capacity of the base portion 103 approaches, reaches, or falls below a required level, the system 100 is altered to begin charging of the AESS 102, so as to stabilize the low-voltage subsystem 102.

The AESS 102 being below the required level can be determined using, for example, an AESS 102 voltage sensor. For simplicity, such a sensor is considered shown schematically by sensor 114, though not all electrical and communication connections are shown in FIG. 1. Changing the system 100 from discharging the AESS 102 to charging the AESS 102 is accomplished by changing the output voltage of the HVEC 106, such as by changing a set point of the HVEC 106 (or, HVEC set point). As provided, output voltage of the HVEC 106 can be controlled by the onboard computer system 116, or the augmented regulated voltage control 117 (e.g., BCM, ECM, etc.), whether integrated into the onboard computer system 117 (as shown in FIG. 2) or the control 117 being part of a stand-alone module (as shown in FIG. 1).

When the set point of the HVEC 106, e.g., a 12.6 V set point, is lower than a charge of the AESS 102 at the time (e.g., 13V), then power needed for the system electrical loads 108 will be pulled from the AESS 102, and no load comes from the HVEC 106. When the charge of the AESS 102 falls to the HVEC set point—e.g., they are both at 12.6V, the system is in equilibrium. Once equilibrium is reached, any energy required by the electrical subsystem loads 108 will be supplied, if solar energy is available, by the solar subsystem 110 via the DC/DC converter 112. Any remainder of energy not satisfied by the solar subsystem 110 is supplied by the HVEC 106. Generally, during equilibrium, very little or no energy is provided to or taken from the base portion 103 of the advanced energy storage subsystem 102.

If the set point of the HVEC 106 (e.g., 13.2V) is higher than the charge of the AESS 102 at the time (e.g., 13V), then while the HVEC 106 is operating, power from the HVEC 106 will be delivered to the AESS 102 to charge it and, if there are any system loads 108, also to the loads 108.

With the added solar buffer 105 of the present technology, the HVEC set point can be set lower, or at least lower on average over time of vehicle operation, than conventionally possible. For instance, where conventional alternators may have been set at 13V, the HVEC 106 according to the present technology can be set at a lower voltage, even if slightly lower, to about 12.9, 12.8, 12.7, even lower, or to any value between 13.0 and about 12.7.

In one embodiment, the AESS 102 is rated 11.5V @ 100 Ah. This AESS 102 can be at 12.9V for 100% SOC, 12.3V for 60% SOC, and 11.5V for 0% SOC. These values can differ based on various factors, such as the manufacturer or the AESS, battery type (e.g., NiMh, LiIon, lead-acid, etc.).

The lower set point is possible because of the additional capacity provided by the solar buffer 105 from which power can be pulled to satisfy vehicle loads 108 before the HVEC 106 needs to be charged. As a result of this ability to operate at a lower set point, the system 100 can operate at a lower system voltage (including lower than in conventional systems using simply a basic RVC described in the Background section, above), and the low-voltage AESS 102 is discharged more than the low-voltage battery of conventional systems.

When the AESS 102 is used more, the HVEC 106 is used less. When the AESS 102 and/or the solar subsystem 110 are satisfying all system loads 108, the HVEC 106 effectively is off. When the HVEC 106 is used less, less output is needed from the high-voltage energy source 104, be it an ICE, a HV battery, HV fuel cell, or other. By significantly lowering HVEC use, the present technology allows a marked increase in fuel economy, for fueled vehicles (e.g., gasoline) and hybrid vehicles, and overall range for electric and hybrid vehicles.

Setting, using the augmented RVC subsystem of the present technology, a lower set point for the HVEC 106 than possible in conventional vehicles (including those with basic RVC) is aggressive, by comparison. This is a reason that the augmented RVC of the present technology itself is referred to as being augmented or aggressive, as described more herein.

Onboard Computer Subsystem

FIG. 2 shows in more detail the onboard computer subsystem 116 of FIG. 1. The onboard computer subsystem 116 includes a computer processor 202 in communication with a tangible computer-readable storage memory or device 204 by way of connecting infrastructure 206, such as a communication bus.

In some embodiments, the storage device 204 includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The storage device 204 includes computer-executable instructions 208. The computer-executable instructions 208 are executable by the processor 202 to cause the processor, and thus the computing subsystem 116, to perform any one or combination of the functions described herein.

The computer-executable instructions 208 can be arranged in one or more software modules. The software modules can be referred to by the operation or operations that they cause the processor 202 to perform. For instance, a software module including instructions that, when executed by the processor 202, cause the processor to perform an operation of determining a particular setting for the high-voltage energy converter 106 can be referred to as a determining software module, an HVEC-setting software module, an HVEC setting determining module, or the like.

As illustrated, the instructions 208 can include the augmented regulated voltage control subsystem 117 (or at least the code thereof) and other code 119. The other code 119 can include instructions for controlling the solar subsystem 110 and/or the solar DDC 112, for instance, and/or other parts of the vehicle system 100 or vehicle at large. The first sub-instructions 117 can be part of the same or different software module as the other sub-instructions 119. The first sub-instructions 117 can be stored at the same hardware component or separate components (e.g., in separate tangible computer-readable storage devices). In one embodiment, the instructions for the augmented RVC 117 are a part of a control module distinct from a body or engine control module, such as shown and described in connection with FIG. 1, while the other instructions 119 are a part of the body or engine control module.

The term software module, or variants thereof, is used expansively herein to include routines, program modules, programs, components, data structures, algorithms, and the like. Software modules can be implemented on various system configurations, including servers, network systems, single-processor or multiprocessor systems, microcontrollers, minicomputers, mainframe computers, personal computers, hand-held computing devices, mobile devices, microprocessor-based, programmable consumer electronics, combinations thereof, and the like.

A portion or portions of the instructions that control the solar subsystem 110, parts thereof, or components associated with the subsystem 110, such as the solar DC/DC convertor 112, can be referred to as a solar subsystem control unit, a solar auxiliary power unit (solar APU) control or controller, or the like. In one embodiment, these instructions along with the hardware housing the instructions (e.g., the storage device 204) are referred to collectively as such (e.g., solar APU controller). In another embodiment, these instructions, along with the hardware holding them (e.g., the illustrated storage device 204) and the processor executing the instructions (e.g., the processor 202) are referred to collectively as such (e.g., solar APU controller).

Inputs to the solar APU controller include, for example, values and/or signals indicating any of the following: voltage of the AESS 102; the state of charge (SOC) of the AESS 102; solar intensity of the ambient environment; whether it is day or night; ambient temperature; AESS 102 temperature; AESS 102 charging or discharging current; DC/DC converter 112 output current; voltage set-point of the HVEC 106; etc.

As shown in FIG. 2, the storage device 204 can also comprise data 210. The data 210 can include various settings, each of which can be static or variable. As an example, the data 210 can include an HVEC setting for selective use by the processor, executing the instructions 208 of the augmented regulated voltage control subsystem, to control output of the high-voltage energy converter 106. As another example, the data 210 can include a boost setting for selective use by the processor, executing the instructions 208, to control the amount of step up performed by the solar DDC 112 on output of the solar array 111.

The processor 202 is also operatively connected to at least one interface 212 for facilitating communications between the computing subsystem 116 and other devices 214. The communication interface(s) 212 include one or more of a variety of input and/or output (I/O) structure facilitating input/output of data to/from the computer subsystem 116, from/to signal receivers, transmitters, or transceivers.

The other devices 214 include the high-voltage energy converter 106 and the solar DDC 112, and can include extra-vehicle, or remote, devices 216. The vehicle devices 214 can include any other of various devices acting as inputs and/or outputs for the computer subsystem 116, such as sensors providing information signals that the computer subsystem uses to perform the functions described herein. An example sensor is the measuring element 114, described above in connection with FIG. 1, measuring current and/or voltage output of the solar array.

The other devices 214 can also include extra-vehicle, remote, devices 216. As an example, in a contemplated embodiment, the computing subsystem 116 can communicate via an appropriate interface 212 with a remote monitoring system (not shown) such as the OnStar® monitoring system of the General Motors Company. The OnStar® system provides numerous services including remote-diagnostics and in-vehicle safety and security. In a contemplated embodiment, any of the data of the computer-readable instructions 204 (e.g., updated code 208 or data 210) is received from such a remote monitoring system.

Although shown in FIG. 2 as a part of the computing subsystem 116, completely, the interfaces 212, or any aspect(s) thereof, are in some embodiments partially or not a part of the computing unit 116. The interfaces 212, or any aspect(s) thereof, can be partially or completely external to and connected or connectable to the computing subsystem 116. For communicating with the extra-vehicle device(s) 216, the interface 212 includes one or more wired, short-range, and long-range transceivers. For short-range wireless communications, the interface, instructions, and processor are configured to use one or more short-range communication protocols, such as WI-FI®, BLUETOOTH®, infrared, infrared data association (IRDA), near field communications (NFC), Dedicated Short-Range Communications (DSRC), the like, and improvements thereof (WI-FI is a registered trademark of WI-FI Alliance, of Austin, Tex., and BLUETOOTH is a registered trademark of Bluetooth SIG, Inc., of Bellevue, Wash.). For long-range wireless communications, the interface, instructions, and processor are configured to use one or more long-range communication protocols, such as those used by a cellular or satellite communications network.

While the processor 202 and memory 204 are shown schematically together in FIG. 2, the processor and the memory 204 are in some embodiments distanced from each other, such as by being positioned in adjacent or more-remote parts of the vehicle system 100. The connecting infrastructure 206 may include structure for wired and/or wireless connection between the processor 202 and memory 204.

Further, one or more features of the computer subsystem 116 can be implemented as a part of one or more computer devices. For instance, the computer subsystem 116 or parts thereof can be part of one or more electronic control modules of the vehicle, such as the BCM or ECM. For example, features of the computer subsystem 116 configured to control the high-voltage energy converter 106 can be provided in one of the BCM and ECM while features of the computer subsystem 116 configured to control the solar DDC 110 are provided in the other of the BCM and ECM.

The computer subsystem 116 and functions performed thereby are described further below in connection with the processes illustrated in FIGS. 3-5.

Methods of Operation

First Exemplary Method

Figure 3:
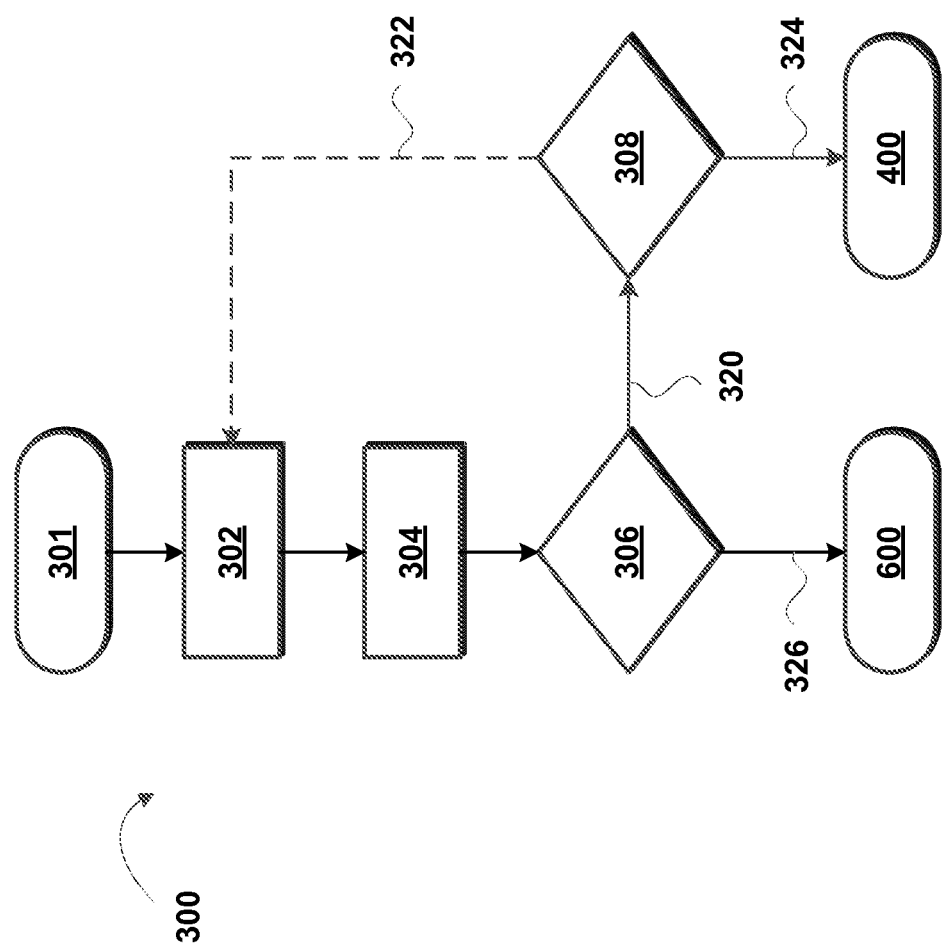
FIG. 3 illustrates a first exemplary method and algorithm, performed by the onboard computer subsystem for controlling outputs of a high-voltage energy converter and a solar subsystem of the vehicle, according to an embodiment of the present technology.

FIG. 3 shows an example method 300, performed by the onboard computer subsystem 116, whether embodied in one or more components, for controlling outputs of the generator and the solar panel shown in FIG. 1.

For each method or sub-method disclosed herein, it should be understood that the steps of the method are not necessarily presented in any particular order and that performance of some or all the steps in an alternative order is possible and is contemplated. The steps have been presented in the demonstrated order for ease of description and illustration. Steps can be added, omitted (e.g., decision 402 described below) and/or performed simultaneously without departing from the scope of the appended claims. It should also be understood that the method can be ended at any time. In certain embodiments, some or all steps of this process, and/or substantially equivalent steps are performed by execution of computer-readable instructions defining an algorithm and being stored or included on a computer readable medium, such as the memory 204 of the computing subsystem 116, for example.

The method 300 illustrated in FIG. 3 begins at 301 and the algorithm proceeds to block 302, whereat determination is made, by at least one processor, of a value for voltage being output by the solar subsystem 110 (or, solar voltage $V_S$), a value for current being output by the solar subsystem 110 (or, solar current $I_S$), and a value for the impedance of the solar subsystem ($Z_S$). The performing processor(s) can include the processor 202, described in connection with FIG. 2. In one embodiment, the solar voltage $V_S$ is measured by the measuring element 114 including a voltage meter. In this case, the measuring element 114 provides, to the computer subsystem 116, a solar-voltage signal indicative of the amount of solar voltage $V_S$.

In one embodiment, the solar current $I_S$ is measured by the measuring element 114 including a type of ammeter. The measuring element 114 provides, to the computer subsystem 116, a solar-current signal indicative of the amount of solar current $I_S$.

In one embodiment, the solar subsystem impedance $Z_S$ is measured by the measuring element(s) 114 and/or calculated (e.g., at the computer subsystem 116) based on output of the element(s) 114. In one case, the element(s) 114 includes an LCR meter measuring inductance (L), capacitance (C), and resistance (R), the measurement values form which can be used to calculate the solar subsystem impedance $Z_S$. If the solar subsystem impedance $Z_S$ is determined at the measuring element 114, the element then provides a signal indicative of the impedance $Z_S$ to the computer subsystem 116.

As provided above, the measuring element 114 illustrated in FIG. 1 can represent one or multiple measuring implements. For the present measurements of voltage and current, for example, the measuring element 114 shown in FIG. 1 can represent a voltmeter distinct from an ammeter. Alternatively, the measuring element 114 shown in FIG. 1 can represent a single implement configured to measure both current and voltage generated by the solar subsystem 110. An example implement for this alternative is a type of multimeter, or multitester, capable of measuring voltage and current. If the implement measures at least resistance along with voltage, the device could also be referred to as a volt-ohm meter (VOM).

From block 302 flow of the algorithm proceeds to block 304 whereat power from the solar subsystem 110 (or, solar power $P_S$) is determined by the processor. In one embodiment, determining the solar power $P_S$ includes calculating the solar power $P_S$ using the solar voltage $V_S$ and solar current $I_S$ determined in operation 302, as: $P_S = V_S \cdot I_S$.

In an alternative embodiment, solar power $P_S$ is determined by a measuring element 114 having an implement such as a wattmeter, or energy meter. In this embodiment, the measuring element 114 measures current and voltage (corresponding to operation 302) and determines the solar power $P_S$ using the measurements. In this embodiment, the processor in this operation 304 receives from the energy meter a power signal indicating the determined solar power $P_S$.

At decision diamond 306, the processor determines whether the solar subsystem 110 is outputting at least a predetermined amount of power—i.e., whether the solar power $P_S$ determined in the previous operation 304 is greater than a predetermined solar-power value, or solar-power minimum value $P_{Min}$. In one embodiment, the predetermined solar-power value is about zero watts. The predetermined solar-power value may be greater than zero, as the designer of the system prefers, without departing from the scope of the present technology. For instance, the solar-power value could be any of 0.1, 0.3, 0.5, or 1.0 watt, a great or lower value, or a value therebetween.

In some embodiments, the solar-power minimum value $P_{Min}$ is set such that the solar power $P_S$ will generally be greater than the minimum $P_{Min}$ whenever the solar array 111 is exposed to solar light. This condition is satisfied usually when the vehicle is outdoors during the day. The determination of diamond 306 can thus be said to determine whether the system 110 should be operated in a day mode or a night mode. These terms are used for explanatory purposes and not necessarily in a limiting sense. For instance, the system 110 may at decision 306 determine that the system should be operated in the night mode while the vehicle is covered within a building in the daytime while it is light outside.

If it is determined that solar power $P_S$ is not being output from the solar subsystem 110 at the predetermined solar-power level $P_{Min}$ (e.g., path 320), the algorithm can be said to enter the nighttime mode (or dark mode, non-solar mode, or the like) and flow of the algorithm proceeds from decision diamond 306 to decision diamond 308.

At this decision 308, the processor determines whether the vehicle is in a drive state. In one embodiment, determining whether the vehicle is in the drive state includes determining whether the vehicle is turned on—e.g., the internal combustion engine, hybrid-vehicle engine, or electric motor is turned on. In one embodiment of the present technology, it is not necessary that the vehicle is being driven—e.g., turned on and put into a driving gear (e.g., a drive or reverse gear), to be considered to be in the drive state.

If it is determined at diamond 308 that the vehicle system 100 is not in the drive state (e.g., path 322), then flow of the algorithm stops, or proceeds back to operation 302.

If it is determined at diamond 308 that the vehicle system 100 is in the drive state (e.g., path 324), then flow of the algorithm can be said to enter the night driving mode (or a drive sub-mode of the nighttime mode), and flow proceeds to transition oval 400. The night driving mode is described below in connection with FIG. 4.

With continued reference to FIG. 3, and particularly decision diamond 306, if it is determined that solar power $P_S$ is being output from the solar subsystem 110 at the predetermined solar-power level $P_{Min}$ (e.g., path 326), the algorithm can be said to enter the daytime (or solar mode, or light mode, or similar) and flow of the algorithm proceeds from decision diamond 306 to transition oval 600. The daytime mode is described below in connection with FIG. 6.

Figure 4:
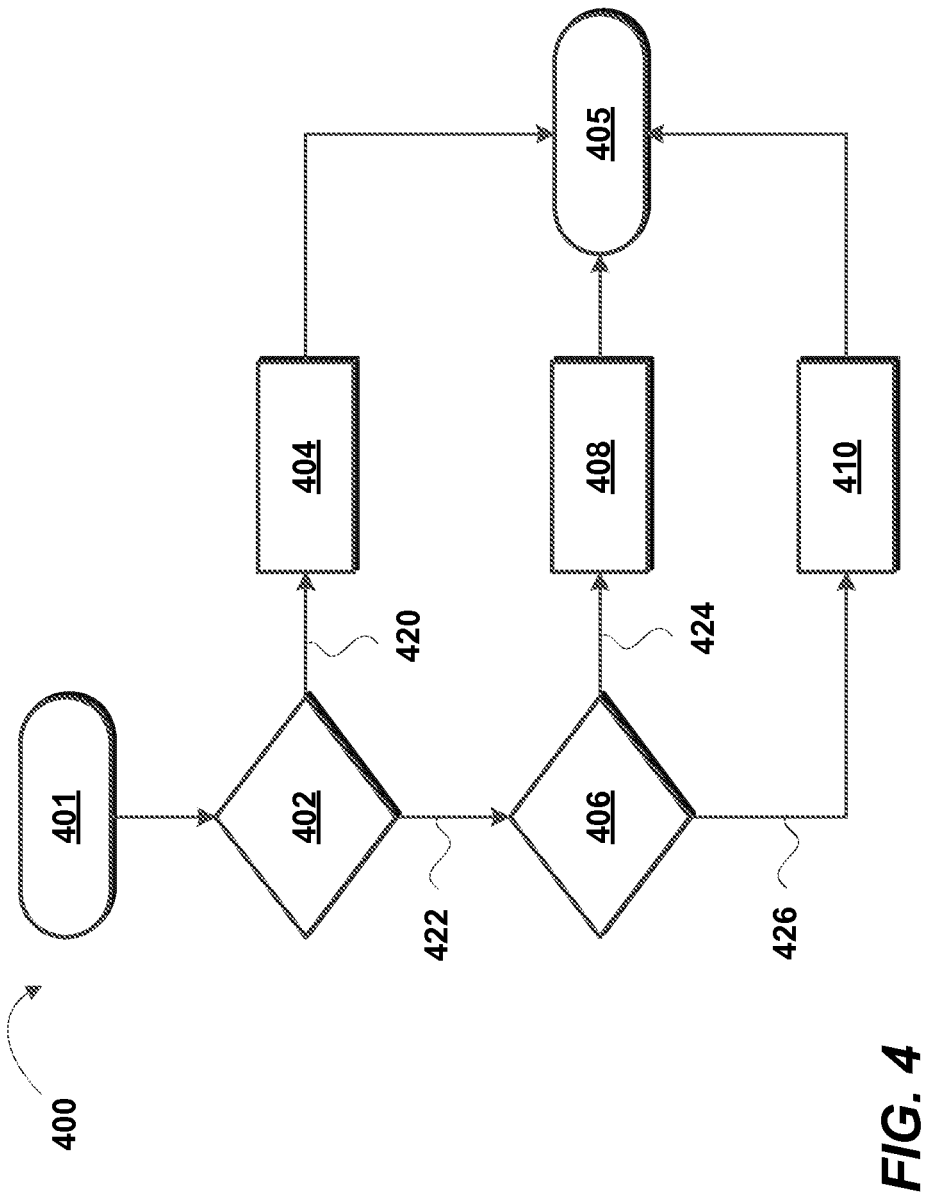
FIG. 4 shows a sub-routine of the method and algorithm of FIG. 3.

The method 300, including sub-methods (e.g., sub-methods 400, 600) need not end when ending transition points in the schematic flow charts are reached, such as the ending transition point at oval 405 of FIG. 4. From any of these points, the method can end or be repeated.

Night Driving Mode of First Exemplary Method

FIG. 4 shows a sub-routine 400 of the method 300 of FIG. 3, according to an embodiment of the present technology. As described above, regarding the corresponding transition oval 400 of the method 300, the sub-routine is used when the system 100 is in what can be referred to as the night driving mode, a night-driving/solar mode, or similar. And as provided, the sub-routine 400 commences responsive to a positive determination at decision diamond 308, as described above regarding FIG. 3.

Upon commencement 401, flow of the algorithm proceeds to decision diamond 402, whereat, the processor determines whether the boost/converter device 115 is present. If the device 115 is not present (e.g., path 420), then flow proceeds to block 404.

At block 404, the processor causes the system 110 to operate in a normal operation mode. In one embodiment, the normal operation includes the processor raising, according to the ARVC, system voltage in order to maintain one or more electrical system outputs, such as headlamp brightness, and/or to allow charging of the AESS 102 at the time.

If the processor determines at decision 402 that the boost/converter device 115 is present (e.g., path 422), flow of the algorithm proceeds to a further decision diamond 406. At decision 406, the processor determines whether a present state-of-charge (SOC) for the advanced energy storage subsystem (AESS) 102 is greater than or equal to a capacity of the base portion 103 of the AESS 102. In one embodiment, this operation includes the processor determining whether the base portion 103 is fully charged.

If at decision 406 the processor determines that the SOC for the AESS 102 is not greater than or equal to at least a capacity of the base portion 103 of the AESS 102 (e.g., the base portion 103 is not fully charged) (e.g., path 424), then flow proceeds to operation 408. At operation 408, the processor sets one or more switches associated with the buck/boost device 115 to allow charging of the AESS 102 with current from the high-voltage energy converter (HVEC) 106. In one embodiment, this charging is performed until it is determined that the base portion 103 is fully charged.

Figure 5:
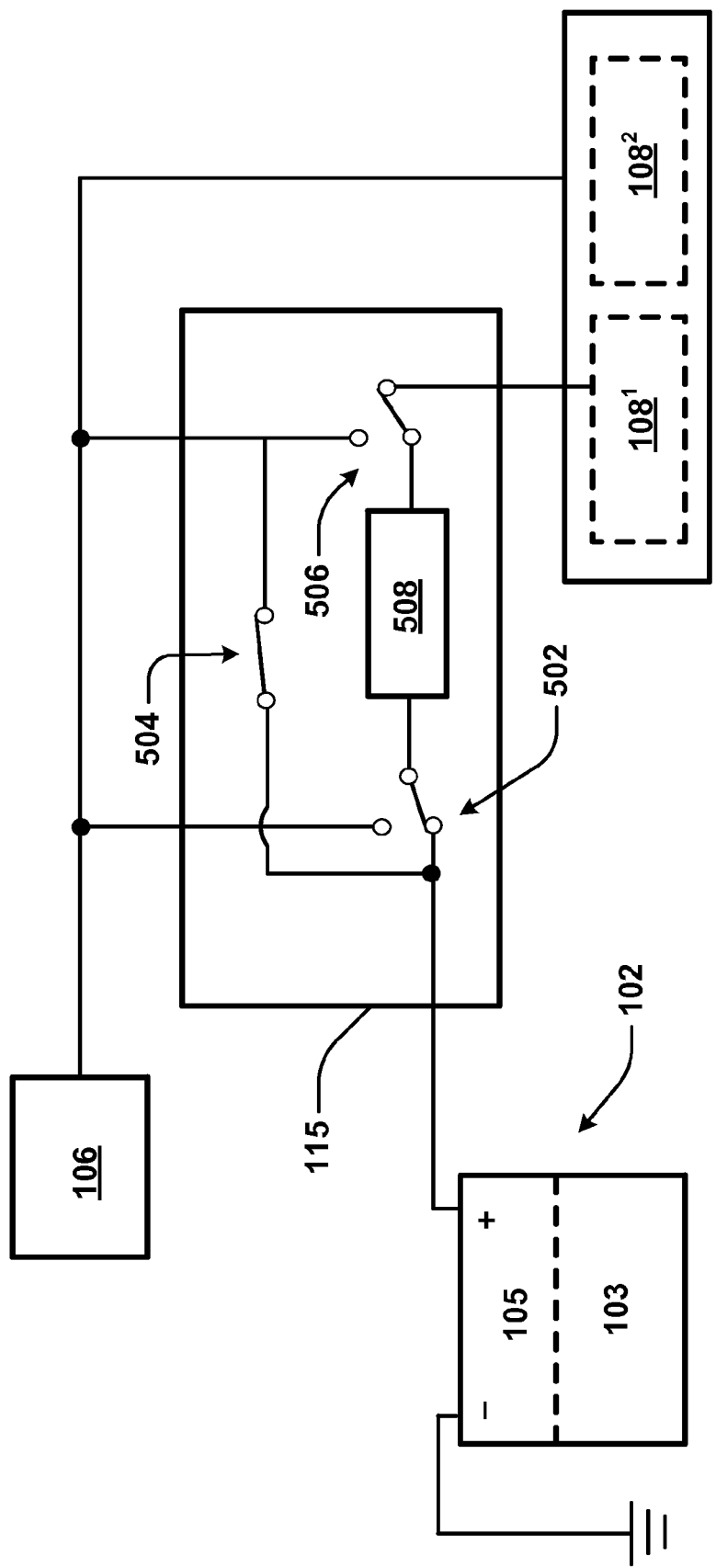
FIG. 5 shows a boost/converter device of the vehicle system of FIG. 1.

FIG. 5 shows exemplary detail for a buck/boost converter device 115. As shown, the boost converter device 115 is connected to the AESS 102, the HVEC 106 and the subsystem loads 108, as in FIG. 1. In the illustrated embodiment, the boost converter device 115 includes a group of switches 502, 504, and 506. A first switch 502 of the group is connected in series with a primary boost/converter component 508 of the boost/converter 115. A second switch 504 of the group is connected in parallel with the primary boost/converter component 508. As shown in FIG. 5, the second switch 504 can also be connected in parallel with the first switch 502. A third switch 506 of the group is also connected in series with the primary boost/converter component 508, as shown in FIG. 5. In some embodiments, one or more of the group of switches is external and connected to the boost/converter device 115 in substantially the same manners shown in FIG. 5—e.g., for the first switch 502, the switch 502 would be connected in series with the boost/converter 115.

With continued reference to block 408 of the method 400 of FIG. 4, in one embodiment of the present technology, for a scenario in which the SOC of the AESS 102 is below the level of the base 103, the processor (i) sets the first switch 502 to a second position (i.e., the up position in the schematic view of FIG. 5) of the switch 502 (i.e., a position enabling power from the HVEC 106 to the converter 115), and (ii) sets the second switch 504 to a first position of the switch 504 (i.e., the down position in the schematic view of FIG. 5), which position is shown in FIG. 5, to allow charging of the AESS 102 by the HVEC 106, and (iii) sets the third switch 506 to the second position (i.e., up in the schematic view of FIG. 5) to connect the HVEC 106 to selective loads 108[1]. These switch positions are set as such in order to supply current from the HVEC 106 to selective loads 108[1] and to allow charging of the AESS 102 with current from the high-voltage energy converter (HVEC)

106 until, e.g., it is determined that the base portion 103 is fully charged. Upon completion of the local goal, e.g., the base portion 103 of the AESS 102 being fully charged, (i) the second switch 504 is opened—e.g., moved to its second position (e.g., the up position for the switch 504 in the schematic view of FIG. 5), and (ii) the third switch 506 is set to the first (down) position to allow the boost converter 508 to supply an elevated voltage to selective loads 108[1], and (iii) the HVEC 106 voltage is lowered to a more energy-efficient level—the boost converter 115 boosts voltage to only those loads which require a higher operating voltage and the main generator (e.g., HVEC) is caused to lower its voltage to an energy conserving level, even during night or dark conditions.

If at decision 406 the processor determines that the SOC for the AESS 102 is greater than at least a capacity of the base portion 103 of the AESS 102 (e.g., that the base portion 103 is fully charged and additional energy is stored in buffer 105) (e.g., path 426), then flow proceeds to operation 410. At operation 410, the processor performs at least the following operations: (i) sets the first switch 502 to the first position (i.e., the down position in the schematic view of FIG. 5), enabling power from the AESS 102 to the converter 115; (ii) sets the second switch 504 to its open position (up in the schematic view of FIG. 5); (iii) sets the third switch 506 to a first position for the switch 506 (i.e., down position in FIG. 5) to connect the boost/converter device 115 (or at least the primary boost/converter component 508 thereof) to at least selective loads 108[1] (see FIG. 5) of the vehicle loads 108 shown in FIGS. 1 and 5, and (iv) commands the HVEC 106 to a lower, more energy efficient, voltage level.

In one embodiment, the switches 502, 504, 506, are set as such, or at least the first and second switch 502, 504 are set and kept as such, in operation 410, until AESS 102 is discharged to about the full level of the base portion 103 (i.e., the solar buffer 105 is depleted). In a further contemplated, embodiment, the processor keeps the switches set in this way until the first of the base portion is fully charged and the solar buffer is depleted.

The processor then changes switch 502, from the first position (down position in FIG. 5) to its second position (up position in FIG. 5) so that power is supplied from the HVEC 106 to the boost converter device 115 (or primary boost/converter component 508 thereof). Switch 504 remains in the second (up in the schematic figure) position to isolate the AESS 102 from the HVEC 106 to maintain the AESS 102 at the SOC level of the base 103.

Further regarding the switches 502, 504, 506 shown in FIG. 5, in one or more various embodiments, the following can be observed. Regarding the first switch 502, in night drive mode (or drive sub-mode of the night mode), if the buffer portion 105 of the AESS 102 has energy, the processor sets the switch 502 to its first position (e.g., down position in FIG. 5) to enable powering of the boost converter 115 from the AESS 102 until the buffer 105 is drained, at which point the processor causes the switch 502 to move to its second (up in the schematic figure) position. The second switch 504 allows selective connection/disconnection of the AESS 102 to/from the HVEC 106, thereby combining or separating powering of the certain vehicle loads 108[1] from other vehicle loads 108[2]. In addition, when the solar buffer 105 has energy, the second switch 504 can be set in the first (down in the schematic figure) position to allow the AESS 102 to provide energy to both non-select loads 108[2] and, via the boost converter 115, selective loads 108[1]. The third switch 506 allows selective powering of the certain vehicle loads 108[1] via the boost converter device 115 and the HVEC 106.

Day Mode of First Exemplary Method

Figure 6:
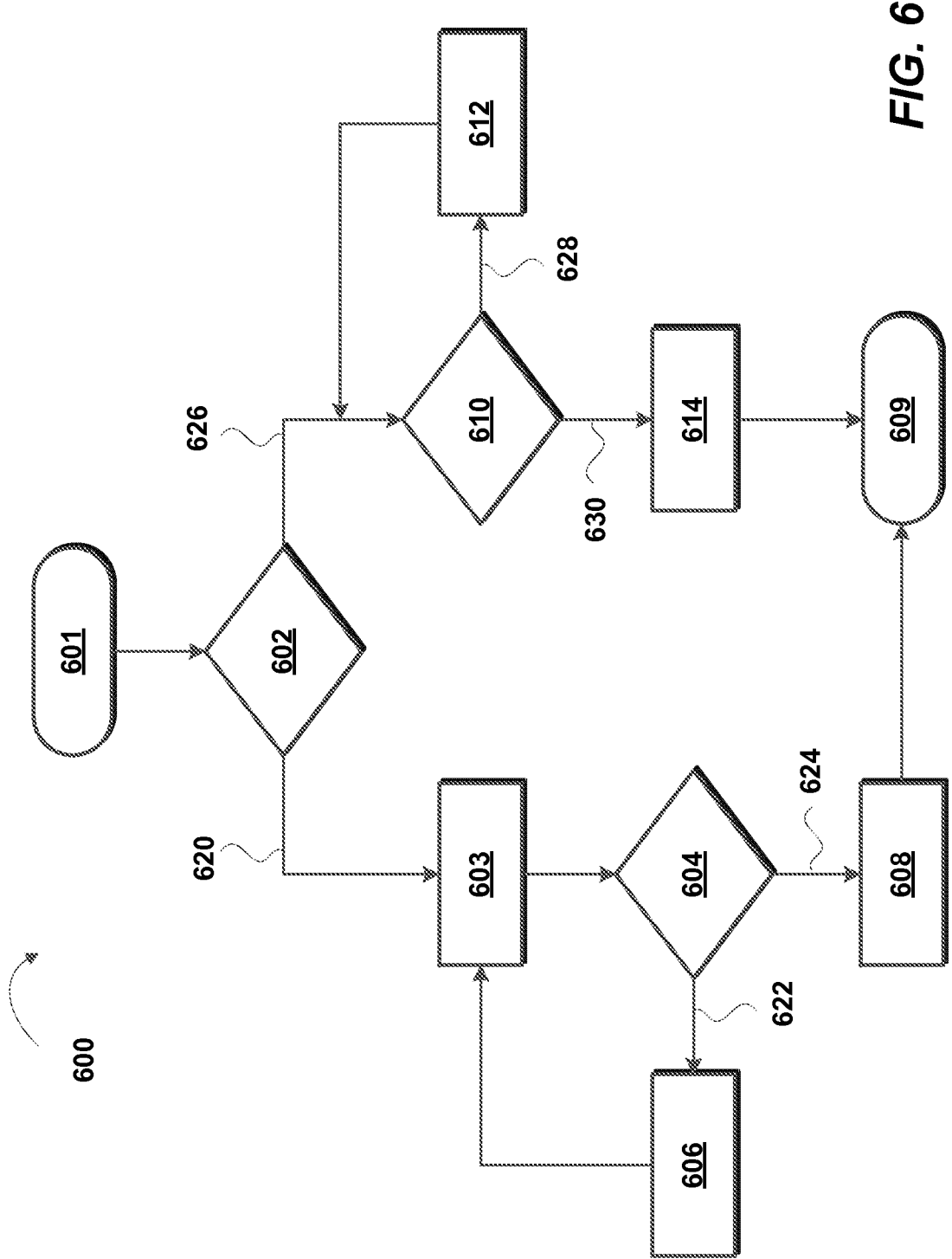
FIG. 6 shows another sub-routine of the method and algorithm of FIG. 3.

FIG. 6 shows a sub-routine 600 of the method 300 of FIG. 3, according to an embodiment of the present technology. As described above, regarding the corresponding transition oval 600 of the method 300, the sub-routine is used when the system 100 is in what can be referred to as the day mode, solar or light mode, or similar. And as provided, the sub-routine 600 commences responsive to a positive determination at decision diamond 306.

Upon commencement 601, flow of the algorithm proceeds to decision diamond 602, whereat, the processor determines whether the vehicle is in the drive state. As provided, in one embodiment, determining whether the vehicle is in the drive state includes determining whether the vehicle is turned on—e.g., the internal combustion engine, hybrid-vehicle engine, or electric motor is turned on, and in one embodiment, it is not necessary that the vehicle is being driven—e.g., turned on and put into a driving gear (e.g., a drive or reverse gear), to be considered to be in the drive state.

If it is determined at diamond 602 that the vehicle system 100 is in the drive state (e.g., path 620), then flow of the algorithm can be said to enter the day driving mode (or a drive sub-mode of the day mode), and flow proceeds to block 603.

At block 603, the processor consults the HVEC or a controller of the HVEC to determine a current setting for HVEC output voltage. The processor then determines, e.g., calculates, an output voltage for the DDC 112 to be sufficiently above the voltage of the HVEC, to effect transfer of energy from the DDC 112 to the vehicular electrical loads 108. In one embodiment, this is performed in order to optimize or maximize transfer of energy from the DDC 112 to the vehicular electrical loads 108. Flow of the algorithm proceeds to decision 604.

At decision 604, the processor determines whether the state-of-charge (SOC) of the AESS 102 is greater than or equal to a present charge of the base portion 103 of the AESS (e.g., whether the base portion 103 is fully charged).

If at decision 604 it is determined that the AESS SOC is not greater than or equal to (i.e., is less than) the charge of the base portion 103 (e.g., path 622), then flow of the algorithm proceeds to operation 606 whereat the processor sets the voltage set point of the HVEC 106 so that the AESS 102 is charged via the HVEC 106. Basically, this involves setting the HVEC 106 to a charging voltage level which is appropriate to the AESS technology being used (e.g., flooded lead acid battery, lithium ion battery, capacitor, etc.), taking into account all applicable variables like the AESS temperature, state-of-health (SOH), state-of-charge (SOC), optimum charge rate, etc.

The operation 606 can be similar (e.g., similar in some or all ways, or identical) to the operation 408 and/or the operation 804, described below. And vice versa—i.e., any features described herein in connection with operations 408 or 804 can be implemented in connection with operation 606. And any features for operation 408 can be attributed to operation 804, and vice versa.

In one embodiment, flow of the algorithm continues from the operation 606 to the affirmative branch from the decision 602—e.g., to operation 603. In some embodiments, the operation 606 is performed for a predetermined amount of time, such as for ten seconds, 30 seconds, two minutes, etc., before the processor again executes the decision 604.

If at the decision 604 it is determined that the AESS SOC is greater than the charge of the base portion 103 (e.g., path 624), then flow of the algorithm proceeds to operation 608 whereat the processor sets the HVEC 106 to an optimized voltage set point to provide power for system loads 108 via the AESS 102. Basically, this involves setting the HVEC 106 to a voltage which approximates, or is equal to, the open circuit voltage (OCV) that the AESS would be at when it is at the base 103 capacity level. The HVEC 106 voltage could be set to an even lower level, for periods of time, to more aggressively discharge/use the energy stored in the buffer 105. Another way to determine/set a degree of aggressiveness with which to lower the HVEC voltage includes monitoring an amount of current being supplied by the HVEC while continuing to lower the voltage setting of the HVEC until the HVEC output current drops to zero amperes.

The solar DDC 112 is caused to buck or boost the voltage output of the solar subsystem 110 to the AESS 102 in order to set the voltage of the AESS 102 to a level that is higher than a voltage level of the high-voltage energy convertor 106.

More particularly, this is accomplished by the solar DDC 112 either receiving instructions from the onboard computer system 116 to set its output voltage to a predetermined value which was calculated by the computer system 116 or by receiving a computer message of the set-point voltage of the HVEC 106, e.g., via a communication data bus or wirelessly, and then internally calculating the amount of voltage required at its output to maximize the energy transfer from the AESS 102 to the subsystem loads 108.

In one embodiment, operation 608 and/or any control operations disclosed herein are performed by the processor executing the SOI described above. As provided, the SOI are in some embodiments part of the augmented RVC, and this operation may be performed in full or in part by the solar APU described above. This operation and/or any others described herein may be performed also by the solar APU.

Benefits of having the solar DDC 112 operating in the buck/boosted state include allowing the solar array panel 111 to operate at the maximum power point for transfer of solar energy to the elect subsystem loads or for the optimum charging of the AESS 102 under various, ambient conditions.

The operation 608 causes (a) satisfaction of vehicle electrical loads with power from the AESS and/or (b) maintenance of the AESS SOC at about the full level of the base portion 103.

With continued reference to the sub-method 600, and particularly to the decision 602, if it is determined that the vehicle system 100 is not in the drive state (e.g., path 626), then the algorithm can be said to enter a day non-driving mode (or rest mode, off mode, a non-driving sub-mode of the day mode, or the like), and flow of the algorithm proceeds to decision diamond 610. At decision 610, the processor determines whether the state-of-charge (SOC) of the AESS 102 is at 100% (i.e., whether the AESS 102 is fully charged). If the SOC is not generally at 100% (e.g., path 628), then flow of the algorithm proceeds to operation 612.

At operation 612, the processor affects the system 100 so that maximum, or optimal, charging current is provided to the AESS 102 from the solar DC/DC convertor (solar DDC) 112, and flow continues to a negative branch from the decision 602. In some embodiments, operation 612 is performed for a predetermined amount of time, such as for ten seconds, 30 seconds, two minutes, etc., before the processor again executes the decision 610.

The processor affecting the system for maximum charging, as mentioned in the preceding paragraph, in one embodiment includes the processor sending a commanded voltage level signal to the solar DDC 112, the commanded voltage level signal instructing the converter 112 to, if not already the case, enter a buck state or a boost state. In the buck/boost state, the solar DDC 112 changes its operation in order to raise or lower the output voltage of the solar array 111 to charge the advanced energy storage subsystem 102.

With continued reference to decision diamond 610, if the SOC is at about 100% (e.g., path 630), then flow of the algorithm proceeds to operation 614. At operation 614, the processor affects the system 100 so that maintenance charging current is provided to the AESS 102 from the solar DDC 112 in order to maintain the 100% SOC of the AESS 102. The processor affecting the system for maintenance charging, as mentioned in the preceding paragraph, in one embodiment includes the processor calculating an optimal maintenance voltage level for the solar DDC 112, based upon factors such as the current temperature of the AESS, type of AESS technology (e.g., flooded lead acid battery, lithium ion battery, capacitor, etc.), and then commanding the DDC 112 to set its output voltage to this level.

From point 609, as at all illustrated ending points, the sub-method or method can be ended or repeated.

Second Exemplary Method

Figure 7:
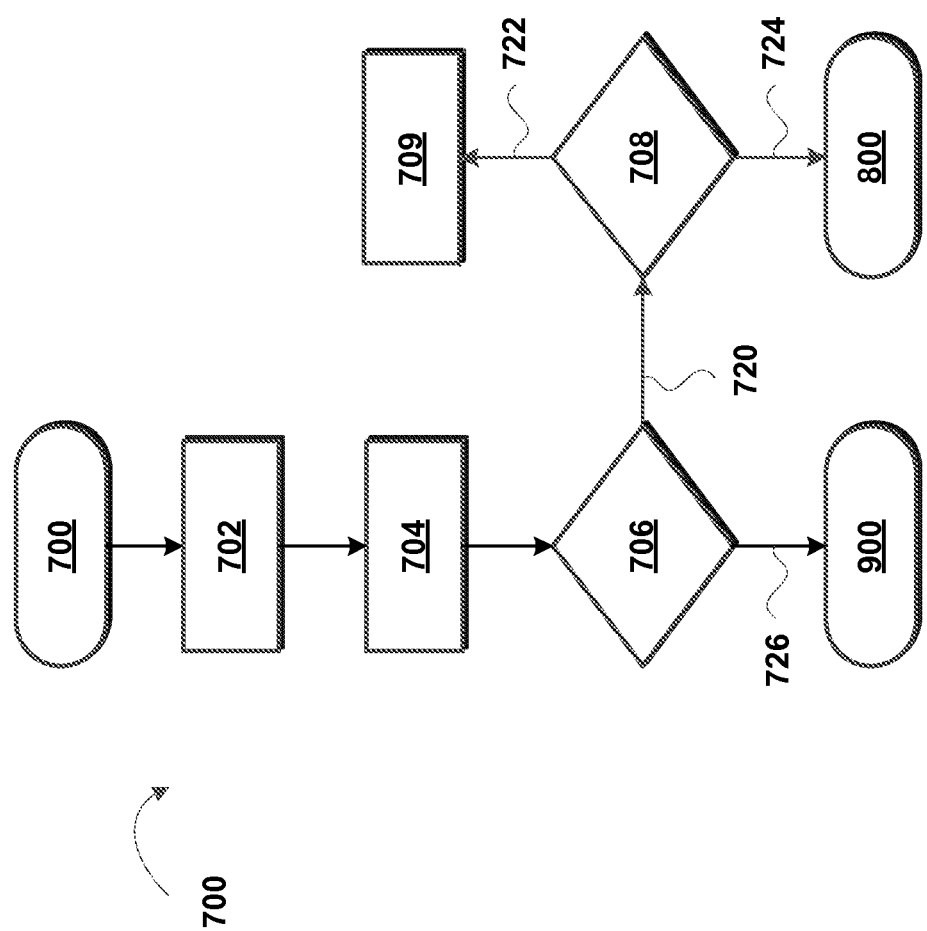
FIG. 7 illustrates a second exemplary method, performed by the onboard computer subsystem for controlling outputs of a high-voltage energy converter and a solar subsystem of the vehicle, according to an embodiment of the present technology.

FIG. 7 shows another example method 700, performed by the onboard computer subsystem 116, whether embodied in one or more components, for controlling outputs of the generator and the solar panel shown in FIG. 1.

Many of the operations are either identical or similar to operations of the first exemplary method and associated sub-methods. To simplify the present disclosure, some of the operations for the method 700 and associated sub-methods are described in part or mostly by reference to the corresponding operations.

The method 700 begins at 701 and the algorithm proceeds to block 702, whereat determination is made, by at least one processor, like the operation 302 of FIG. 3. From block 702, flow of the algorithm proceeds to block 704, which is similar to operation 304, described above.

From block 704, the method 700 proceeds to decision 706, which is like decision 306, described above. If it is determined at decision 706 that solar power $P_S$ is not being output from the solar subsystem 110 at the predetermined solar-power level $P_{Min}$ (e.g., path 720), the algorithm can be said to enter the nighttime mode (or dark mode, non-solar mode, or the like) and flow of the algorithm proceeds from decision diamond 706 to decision diamond 708.

At this decision 708, the processor determines whether the vehicle is in a drive state. The decision can be like decision diamond 308, as it is described above. If it is determined at diamond 708 that the vehicle system 100 is not in the drive state (e.g., path 722), then flow of the algorithm proceeds to operation 709.

At operation 709, the processor set the solar DC/DC convertor (solar DDC) 112 to a monitor or sleep mode. The operation could also include setting any other components associated with the solar charging system to a monitor or sleep mode. In this mode, the DDC 112, and any related components, may continue to monitor the solar power level periodically to adjudicate whether the sunlight has become available at the array 111 (by, e.g., the sun having risen) while the vehicle is parked. In one embodiment, this operation is performed in a manner or mode that would consume as little energy from the AESS 102 as possible, which mode can be referred to as a monitor mode. Any electronic modules which do not contribute to the monitoring of changing sunlight conditions, while the vehicle is off, would be turned off or put in a sleep mode which they could be woken up from when conditions require their function or operation.

If it is determined at diamond 708 that the vehicle system 100 is in the drive state (e.g., path 724), then flow of the algorithm can be said to enter the night driving mode (or a drive sub-mode of the nighttime mode) for this second exemplary method, and flow proceeds to transition oval 800. The night driving mode for this alternative is described below in connection with FIG. 8.

With continued reference to FIG. 7, and particularly decision diamond 706, if it is determined that solar power $P_S$ is being output from the solar subsystem 110 at the predetermined solar-power level $P_{Min}$ (e.g., path 726), the algorithm can be said to enter the daytime (or solar mode, or light mode, or similar) for this second exemplary method, and flow of the algorithm proceeds from decision diamond 706 to transition oval 900. The daytime mode for this alternative is described below in connection with FIG. 9.

The second exemplary method 700, including sub-methods (e.g., sub-methods 800, 900) need not end when ending transition points (e.g., point 809 in FIG. 8) in the schematic flow charts are reached. From any of these points, the sub-method or method can end or be repeated.

Night Driving Mode of Second Exemplary Method

Figure 8:
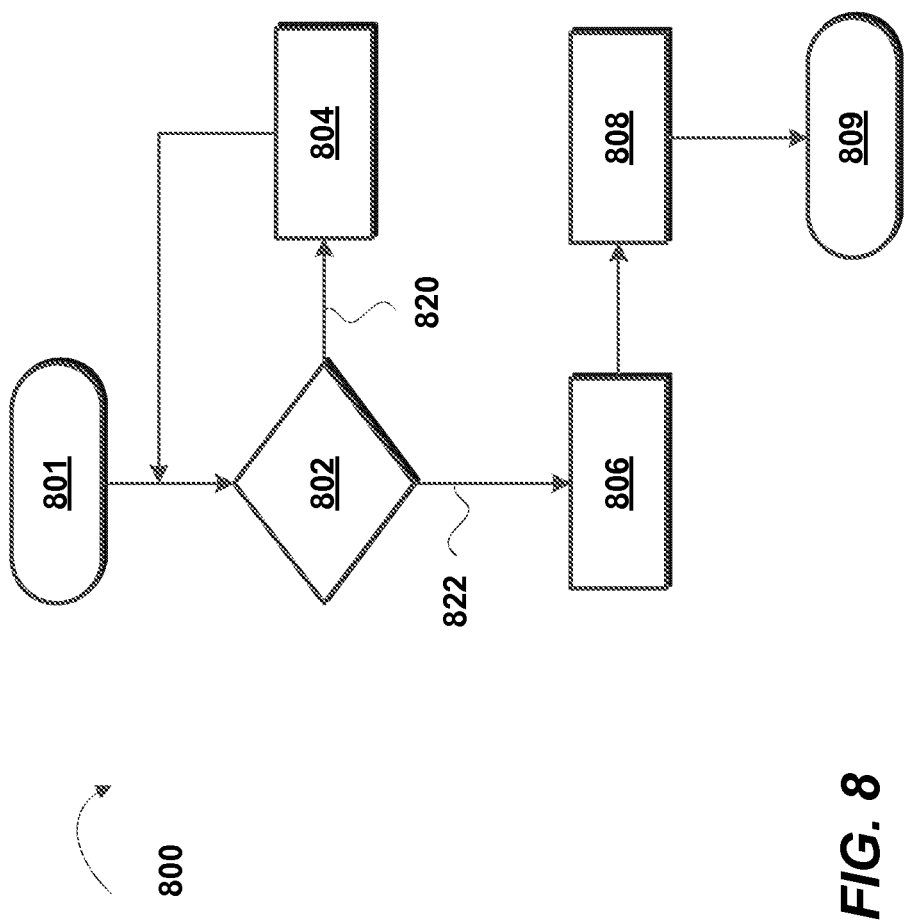
FIG. 8 shows a sub-routine of the method and algorithm of FIG. 7.

FIG. 8 shows a sub-routine 800 of the method 700 of FIG. 7, according to an embodiment of the present technology. As described above, regarding the corresponding transition oval 800 of the method 700, the sub-routine is used when the system 100 is in what can be referred to as the night driving mode, a night-driving/solar mode, or similar, according to the second exemplary method. And as provided, the sub-routine 800 commences responsive to a positive determination at decision diamond 708, as described above regarding FIG. 7.

Upon commencement 801, flow of the algorithm proceeds to decision diamond 802, whereat, the processor determines whether a present state-of-charge (SOC) for the advanced energy storage subsystem (AESS) 102 is greater than or equal to a capacity of the base portion 103 of the AESS 102. In one embodiment, this operation includes the processor determining whether the base portion 103 is fully charged. The decision 802 can be similar to operation 406 of FIG. 4.

If at decision 802 the processor determines that the SOC for the AESS 102 is not greater than or equal to at least a capacity of the base portion 103 of the AESS 102 (e.g., the base portion 103 is not fully charged) (e.g., path 820), then flow proceeds to operation 804. At operation 804, the processor sets the voltage set point of the HVEC 106 so that the AESS 102 is charged via the HVEC 106. This operation 804 can be similar to the operation 606, described above. In one embodiment, for instance, the charging of operation 804 is performed until it is determined that the base portion 103 is fully charged. From operation 804, flow continues to the repeat the decision 802.

If at decision 802 the processor determines that the SOC for the AESS 102 is greater than or equal to at least a capacity of the base portion 103 of the AESS 102 (e.g., the base portion 103 is fully charged) (e.g., path 822), then flow proceeds to operation 806. At operation 806, the processor activates the buck/boost converter device 115 to boost voltage of the AESS 102 to about a level of either (i) all electrical subsystem loads 108 or (ii) selective loads 108[1] (referenced in FIG. 5) needing a higher voltage, e.g. headlamps, fuel pump, etc. The operation 806 can be similar to the operation 410, and vice versa.

From operation 806, flow of the algorithm proceeds to operation 808, whereat the processor sets the HVEC 106 to (a) optimize its voltage set-point to provide power, via the AESS 102, for system loads 108 and/or (b) maintain the AESS at the present level of the base portion 103. The operation 808 can be similar to the operation 608, described above.

At point 809, the sub-method, or the method 700, can be repeated or ended.

Day Mode of Second Exemplary Method

Figure 9:
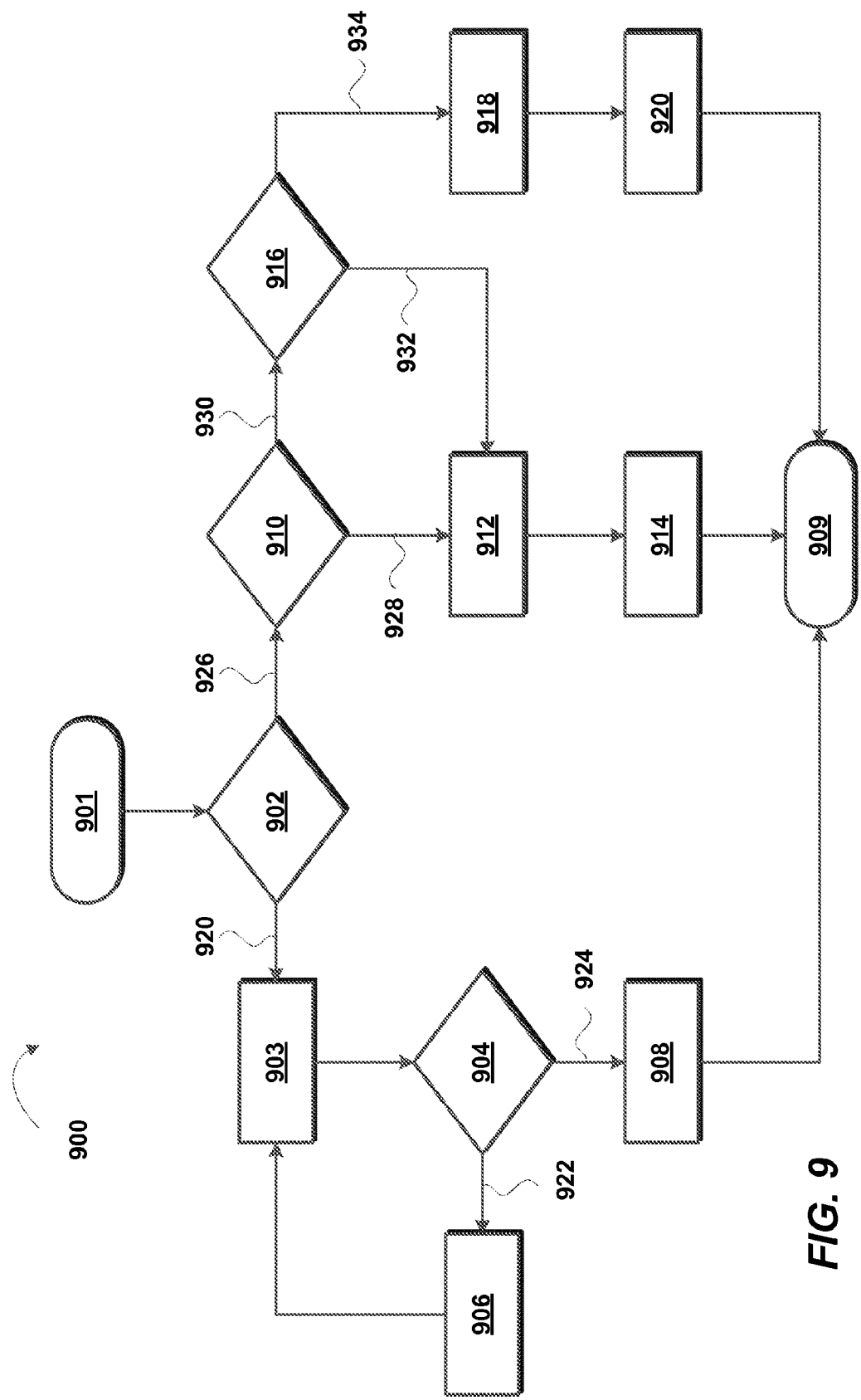
FIG. 9 shows another sub-routine of the method and algorithm of FIG. 7.

FIG. 9 shows a sub-routine 900 of the alternative method 700 of FIG. 7. As described above, regarding the corresponding transition oval 900 of the alternative method 700, the sub-routine is used when the system 100 is in what can be referred to as the day mode, solar or light mode, or similar, of the second example method. And as provided, the sub-routine 900 commences responsive to a positive determination at decision diamond 706.

Upon commencement 901, flow of the algorithm proceeds to decision diamond 902, whereat, the processor determines whether the vehicle is in the drive state. The decision 902 can be similar to that of related decisions, e.g., 308, 602, 708, described herein above.

If it is determined at diamond 902 that the vehicle system 100 is in the drive state (e.g., path 920), then flow of the algorithm can be said to enter the day driving mode (or a drive sub-mode of the day mode) for this alternative method 700, and flow proceeds to block 903.

Operation 903 can be generally the same as that provided above in connection with operation 603, described above. Flow proceeds to decision 904.

At decision 904, the processor determines, like at decision 604, whether the state-of-charge (SOC) of the AESS 102 is greater than or equal to a present charge of the base portion 103 of the AESS (e.g., whether the base portion 103 is fully charged).

If at decision 904 it is determined that the AESS SOC is not greater than or equal to (i.e., is less than) the charge of the base portion 103 (e.g., path 922), then flow of the algorithm proceeds to operation 906 whereat the processor sets the voltage set point of the HVEC 106 so that the AESS 102 is charged via the HVEC 106. This operation 906 can be similar to operation 606 described above.

In one embodiment, flow of the algorithm continues from operation 906 to the affirmative branch from the decision 902—e.g., to operation 903.

In some embodiments, operation 906 is performed for a predetermined amount of time, such as for ten seconds, 30 seconds, two minutes, etc., before the processor again executes the decision 904.

If at decision 904 it is determined that the AESS SOC is greater than the charge of the base portion 103 (e.g., path 924), then flow of the algorithm proceeds to operation 908, which can be similar to operation 608, described above.

With continued reference to the sub-method 900, and particularly to the decision 902, if it is determined that the vehicle system 100 is not in the drive state (e.g., path 926), then the algorithm can be said to enter a day non-driving mode (or rest mode, off mode, a non-driving sub-mode of the day mode, or the like), and flow of the algorithm proceeds to decision diamond 910. At decision 910, the processor determines whether there is a vehicle electrical load need. In one implementation, the processor makes this determination based on at least one electrical load request that has been issued and/or received in connection with one or more of the electrical loads 108. The load request(s) relates to a need for electrical power in the vehicle and can relate particularly to, e.g., a need of a vehicle fan, heater, and/or other electrical load elements 108.

In response to a negative result at decision 910 (e.g., path 928), flow of the algorithm proceeds to operation 912 whereat the processor affects the system 100 so that the AESS 102 is charged. Charging the AESS 102 at this operation 912 can be accomplished in accord with the operations described above in connection with operation 612. And vice versa—i.e., operation 612 can include any of the features described here regarding operation 912. In one embodiment, the charging is effected until the AESS 102 is at 100% state-of-charge (SOC).

Flow continues from operation 912 to operation 914, whereat the processor, like operation 614, affects the system 100 so that maintenance charging current is provided to the AESS 102 from the solar DDC 112 in order to maintain the 100% SOC of the AESS 102.

In response to a positive result at decision 910 (i.e., satisfaction of load(s) is being requested) (e.g., path 930), flow of the algorithm continues to decision diamond 916, whereat the processor determines whether a load power $P_L$ (e.g., an amount of power required by the electrical loads, which amount can be communicated in or otherwise associated with the above-described request(s) for power) is greater than the power being received from the solar subsystem 110 (or, solar power $P_S$). If so (e.g., path 932), flow proceeds to operation 912, as shown in FIG. 9. If not (e.g., path 934), flow proceeds to operation 918.

At operation 918, the processor supplies power to the loads 108. The processor does this by turning on the load, either by activating the electronic module which controls the load, or by supplying power to a load via an electronic or mechanical switch.

At operation 920, the common electrical connection of the AESS 102, the output of the DDC 112, and the load causes any solar power $P_S$ that may be left over after the load is satisfied at operation 918 to be provided to the AESS 102 for charging the AESS.

From point 909, as at all illustrated ending points, the sub-method or method can end or be repeated.

Any one or more of the values disclosed herein (e.g., thresholds, set points, maximums, etc., used in the algorithm) can be a part of the computer-readable instructions (e.g., the code 208) or a part of supporting data (e.g., data 210). As provided, portions of the instructions and/or supporting data described herein could be separate from a vehicle BCM, ECM, or other primary control module, such as by being a part of the solar APU described. Relevant values include the predetermined solar-power value and the first and second predetermined solar-energy values.

Third Exemplary Method

Figure 11:
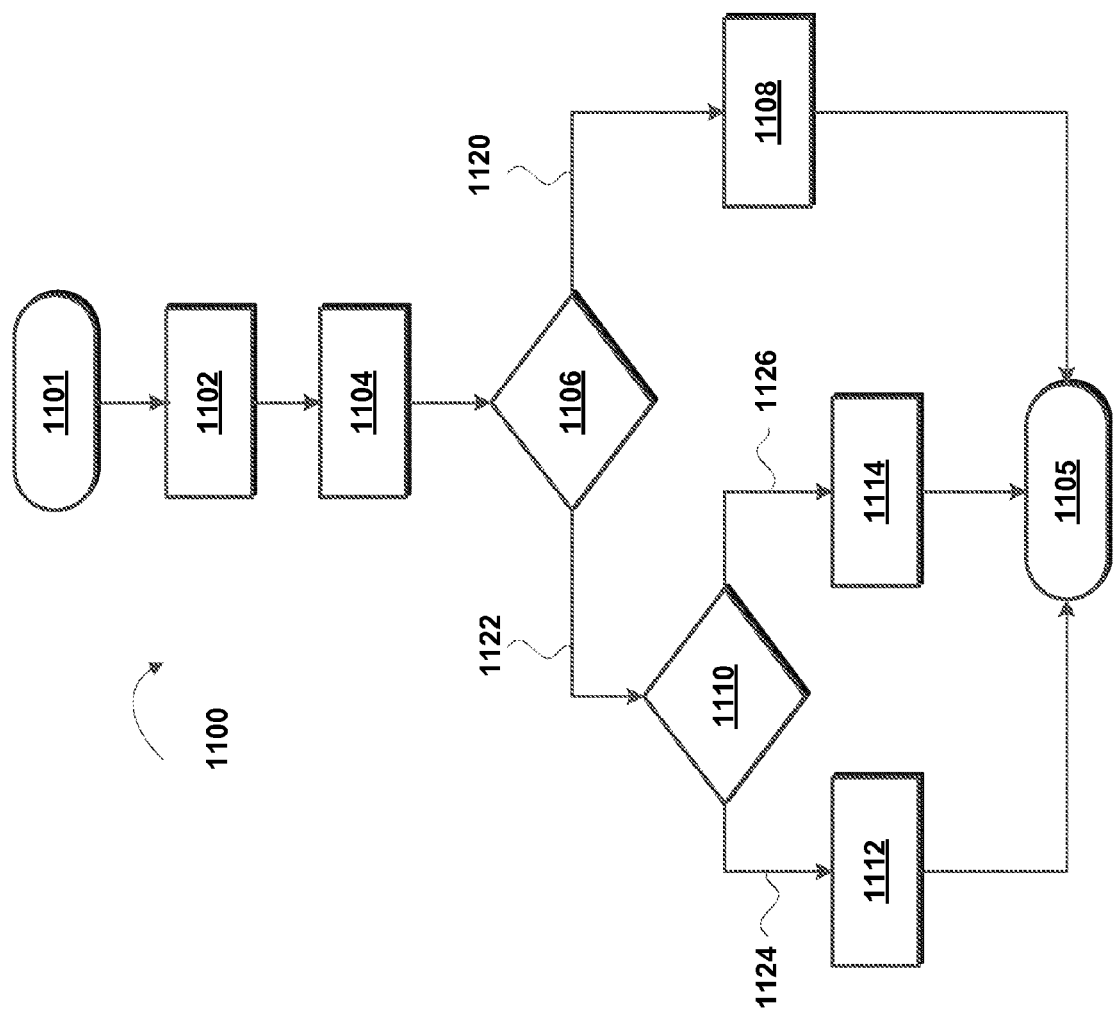
FIG. 11 illustrates a third exemplary method and algorithm according to the present technology.

FIG. 11 shows another example method 1100, performed by the onboard computer subsystem 116, whether embodied in one or more components, for controlling outputs of system parts shown in FIG. 1, such as the HVEC, 106, the solar DDC 112, etc.

Many of the operations are either identical or similar to operations of the earlier described exemplary methods including associated sub-methods. To simplify the present disclosure, some of the operations for the method 1100 and associated sub-methods are described in part or mostly by reference to the corresponding operations.

The method 1100 begins at 1101 and the algorithm proceeds to operations 1102, 1104, which can be like operations 302, 304 described above in connection with FIG. 3. From block 1104, flow of the algorithm proceeds to decision 1106, which can be like decision 306 (e.g., a determination of whether a present solar power value is above a preset minimum value).

In response to a negative determination at decision 1106 (e.g., path 1120), flow proceeds to operation 1108, which can be like operation 709 of FIG. 7.

In response to an affirmative determination at decision 1106 (e.g. the vehicle is in the drive mode) (e.g., path 1122), flow proceeds to decision 1110, which can be like decision 602 of FIG. 6 (e.g., a determination of whether the vehicle is in a drive or a run mode).

In response to a negative result at decision 1110 (e.g., path 1124), flow proceeds to operation 1112, which can be like operation 614 and/or 914, described above in connection with FIGS. 6 and 9, respectively.

In response to an affirmative result at decision 1110 (e.g., path 1126), flow proceeds to operation 1114, which can be like operation 603, described above in connection with FIG. 6.

From point 1105, as at all illustrated ending points, the sub-method or method can end or be repeated.

CONCLUSION

Benefits of the present technology include much more efficient vehicle operation, not possible prior to the present teachings. Improvements are now possible in at least the areas of fuel economy, driving range for electric and alternate fuel vehicles, high-voltage battery life for electric vehicles, and emissions due to decreased use of fossil fuels and utilization of a renewable energy source for vehicular applications.

Regarding an example improvement, it is noted that present-day vehicles, using solar energy in other ways, as described in the Background section above, may accomplish perhaps only tenths of a mile increased miles/gallon fuel efficiency per day of average vehicle driving. This correlates to only about one or perhaps a very few miles per week improvement. The present technology on the other hand makes possible fuel efficiencies that are multiples higher, on the order of at least two to three miles improvement per day. This performance correlates to at least about fourteen (14) to about twenty-one (21) miles per week improvement.

References herein to modes, states, conditions, and the like are interchangeable for some embodiments. For instance, the optimized-voltage state, the buck and/or boost voltage state, and/or the on-state can be considered as modes. Further in this example, these three states could thus be considered as an optimized-voltage mode, a buck and/or boost voltage mode, and an on mode, respectively. These same example modes (the optimized-voltage mode, the buck/boost-voltage mode, and the on mode) can be considered sub-modes (e.g., an optimized-voltage sub-mode, a buck/boost-voltage sub-mode, and an on sub-mode) in embodiments in which they are part of the modes described herein—e.g., the day and night-driving/solar modes.

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

The invention claimed is:

1. A non-transitory computer-readable storage device comprising computer-executable instructions that, when executed by a processor, cause the processor to perform operations, for controlling a vehicle electrical system including (a) a solar subsystem and (b) a low-voltage advanced energy storage subsystem (AESS) having (i) a base portion for storing and providing base power to satisfy electrical loads of the vehicle and (ii) a solar buffer for storing and providing supplemental power to satisfy the electrical loads, the operations comprising:
   determining whether an amount of solar power, being output by the solar subsystem, is greater than a predetermined solar-power value;
   operating, if the solar power is greater than the predetermined solar-power value and the vehicle is turned on, the vehicle electrical system in a light-drive mode, including using the solar power selectively to charge the AESS to a full level of the base portion, maintain a charge of the AESS at the full level of the base portion, or satisfy electrical loads of the vehicle;
   operating, if the solar power is not greater than the predetermined solar-power value and the vehicle is turned on, the vehicle electrical system in a dark-drive mode, including using the solar power selectively to charge the AESS to, or maintain the charge of the AESS at, the full level of the base portion;
   operating, if the solar power is greater than the predetermined solar-power value and the vehicle is turned off, the vehicle electrical system in a light-rest mode, including using the solar power selectively to charge the AESS, or maintain the charge of the AESS above, the full level of the base portion and the solar buffer; and
   operating, if the solar power is not greater than the predetermined solar power value and the vehicle is turned off, the vehicle electrical system in a dark-rest mode.

2. The non-transitory computer-readable storage device of claim 1, wherein:
   the determining is performed in a first determination operation; and
   operating the electrical system in the light-drive mode, including using the solar power selectively to charge the AESS to the full level of the base portion, maintain the charge of the AESS at the full level of the base portion, or provide electrical energy to satisfy the electrical loads, comprises:
      determining, in a second determination operation, an appropriate output voltage for a solar DC-to-DC converter (solar DDC) of the electrical system to be greater than a present setting of a high-voltage energy converter (HVEC) of the electrical system;
      initiating setting of the solar DDC to effect output from the solar DDC of the output voltage determined to the AESS;
      determining whether a state-of charge (SOC) of the AESS is less than the full level of the base portion;
      setting, if it is determined that the AESS SOC is not less than the full level of the base portion, the HVEC of the electrical system to a first voltage set point causing (A) satisfaction of vehicle electrical loads with power from the AESS and/or (B) maintenance of the AESS SOC at about the full level of the base portion; and
      if it is determined that the AESS SOC is less than the full level of the base portion:
         setting the HVEC of the electrical system to a second voltage set point causing charging of the AESS via the HVEC; and
         returning to the first determination operation.

3. The non-transitory computer-readable storage device of claim 1, wherein:
   the determining is a first determining operation; and
   operating the electrical system in the dark-drive mode, including using the solar power selectively to charge the AESS to, or maintain the charge of the AESS at, the full level of the base portion, comprises determining, in a second determining operation, whether a state-of charge (SOC) of the AESS is less than the full level of the base portion of the AESS.

4. The non-transitory computer-readable storage device of claim 3, wherein operating the electrical system in the dark-drive mode, including using the solar power selectively to charge the AESS to, or maintain the charge of the AESS at, the full level of the base portion, comprises:
   setting, if the state-of charge (SOC) of the AESS is less than the full level of the base portion, a buck/boost device (BBD) of the electrical system causing charging of the AESS with current from a high-voltage energy converter (HVEC) until the SOC reaches the full level of the base portion; and
   setting, if the state-of charge (SOC) of the AESS is not less than the full level of the base portion, the BBD causing satisfaction of electrical vehicle loads using power from the AESS until the solar buffer of the AESS is depleted.

5. The non-transitory computer-readable storage device of claim 3, wherein:
   operating the electrical system in the dark-drive mode, including using the solar power selectively to charge the AESS to, or maintain the charge of the AESS at, the full level of the base portion, comprises:
      determining, in a third determining operation, whether a buck/boost device (BBD) is present; and
      initiating, if the BBD is not present, a normal operation mode for the electrical system wherein system voltage is raised to meet electrical loads and the AESS is charged; and
   the second determining operation is performed if it is determined that the BBD is present.

6. The non-transitory computer-readable storage device of claim 3, wherein operating the electrical system in the dark-drive mode, including using the solar power selectively to charge the AESS to, or maintain the charge of the AESS at, the full level of the base portion, comprises:
   setting, if the state-of charge (SOC) of the AESS is less than the full level of the base portion, a high-voltage energy converter (HVEC) of the electrical system to a second voltage set point to cause charging of the AESS via the HVEC; and
   returning to the second determining operation.

7. The non-transitory computer-readable storage device of claim 3, wherein operating the electrical system in the dark-drive mode, including using the solar power selectively to charge the AESS to, or maintain the charge of the AESS at, the full level of the base portion, comprises performing if the state-of charge (SOC) of the AESS is not less than the full level of the base portion activating, further operations comprising:
   setting a buck/boost device of the electrical system to boost AESS voltage for meeting electrical system loads using power from the AESS; and
   setting a high-voltage energy converter (HVEC) of the electrical system to a first voltage set point causing (A)

satisfaction of vehicle electrical loads with power from the AESS and/or (B) maintenance of the AESS SOC at about the full level of the base portion.

8. The non-transitory computer-readable storage device of claim 1, wherein:
the determining is performed in a determining operation; and
operating the electrical system in the dark-rest mode comprises returning to the determining operation.

9. The non-transitory computer-readable storage device of claim 1, wherein operating the electrical system in the dark-rest mode comprises setting a solar DC-to-DC converter (solar DDC) to a sleep mode.

10. The non-transitory computer-readable storage device of claim 1, wherein:
the determining is a first determining operation;
operating the electrical system in the light-rest mode, including using the solar power selectively to charge the AESS to, or maintain a charge of the AESS above, the full level of the base portion and the solar buffer, comprises:
determining, in a second determining operation, whether the AESS, including the base portion and the solar buffer, is at full state-of-charge (SOC);
if it is determined that the AESS is not at full SOC:
sending, to a solar DC-to-DC converter (DDC) of the electrical system, a boost signal instructing the solar DDC to enter a boost state to boost voltage output of the solar subsystem thereby charging the AESS when there is an electrical system load need; and
returning to the second determination operation; and
affecting, if it is determined that the AESS is at full SOC, the electrical system to maintain the AESS at full state-of-charge (SOC) by causing a maintenance charging current is provided to the AESS from the solar DDC.

11. The non-transitory computer-readable storage device of claim 1, wherein operating the electrical system in the light-rest mode, including using the solar power selectively to charge the AESS to, or maintain a charge of the AESS above, the full level of the base portion and the solar buffer, comprises:
determining whether there is an electrical system load need;
if it is determined that there is an electrical system load need:
sending, to a solar DC-to-DC converter (DDC) of the electrical system, a boost signal instructing the solar DDC to enter a boost state to boost voltage output of the solar subsystem thereby charging the AESS until the base portion and solar buffer are fully charged or a voltage level of the AESS is higher than a voltage level of HVEC; and
affecting the electrical system to maintain the AESS at full state-of charge (SOC) by causing a maintenance charging current is provided to the AESS from the solar DDC;
determining, if it is determined that there is not an electrical system load need, whether a load power required by the electrical load is greater than a solar power being output by the solar subsystem;
sending the boost signal if it is determined that the load power is greater than the solar power; and
if it is determined that the load power is not greater than the solar power:
initiating satisfying the electrical load using the solar power from the solar subsystem; and
initiating charging the AESS using any solar power leftover after the electrical load is satisfied.

12. The non-transitory computer-readable storage device of claim 1, wherein:
the base portion of the AESS, when fully charged, has electrical capacity sufficient alone to satisfy all low-voltage electrical loads of the vehicle;
the solar buffer is an additional portion of the AESS to provide additional capacity for storing solar power at the AESS in addition to power stored at the base portion of the AESS;
power is only provided to the solar buffer if the base portion is full; and
power is only taken from the base portion if the solar buffer is depleted.

13. A vehicle system comprising:
a low-voltage advanced energy storage subsystem (AESS) including:
a base portion that, when fully charged, has electrical capacity sufficient to satisfy all low-voltage electrical loads of the vehicle; and
a solar buffer as an additional portion of the AESS to provide additional capacity for storing power at the AESS as supplemental power in addition to power stored at the base portion of the AESS;
wherein, in operation of the system:
power is provided only to the base portion until the base portion is full, and then power is provided only to the solar buffer; and
power is taken only from the solar buffer until the solar buffer is depleted, and then power is taken only from the base portion;
a solar subsystem, connected electrically to the AESS and configured to generate the solar power using solar energy; and
a high-voltage energy converter (HVEC), connected electrically to a high voltage energy source (HVES) and configured to generate high-voltage power which is subsequently converted to a converted low-voltage power for use in the system.

14. The vehicle system of claim 13, further comprising a computer-readable storage medium having non-transitory computer-executable instructions that, when executed by a processor, cause the processor to control operation of the system by setting selectively at least (a) a solar DC-to-DC converter (solar DDC) connected electrically to the solar subsystem, the AESS, and the low-voltage electrical loads, and (b) a buck/boost device connected electrically to the HVEC, the AESS, and the low-voltage electrical loads.

15. The vehicle system of claim 13, further comprising:
a solar DC-to-DC converter (solar DDC) connected electrically to the solar subsystem, the AESS, and the low-voltage electrical loads; and
a computer-readable storage medium having computer-executable instructions that, when executed by a processor, cause the processor to set selectively a power switch component to control output of the solar DDC to provide energy selectively to at least one recipient selected from a group consisting of: the low-voltage electrical loads, the base portion of the AESS, and the solar buffer of the AESS.

16. The vehicle system of claim 13, further comprising a computer-readable storage medium having non-transitory computer-executable instructions that, when executed by a processor, cause the processor to perform an operation of selectively controlling whether the low-voltage vehicle loads are satisfied by (a) the solar power directly from the solar subsystem, (b) the supplemental power, (c) the converted low-voltage power, (d) a combination of two of (a)-(c), simultaneously, or (e) all three (a)-(c), simultaneously.

17. The vehicle system of claim 16, wherein satisfying the low-voltage vehicle loads using the combination of two of items (a)-(c) comprises satisfying the loads using items (b) and (c), whereby the supplemental power of the solar buffer is used decreasingly to satisfy the vehicle loads and the converted low-voltage power is used increasingly to satisfy the vehicle loads until the solar buffer is depleted.

18. The vehicle system of claim 13, further comprising a physical separation between the base portion of the AESS and the solar buffer of the AESS.

19. A non-transitory computer-readable storage device comprising computer-executable instructions that, when executed by a processor, cause the processor to perform operations, for controlling a vehicle electrical system including (a) a solar subsystem and (b) a low-voltage advanced energy storage subsystem (AESS) including a base portion and a solar buffer for storing power and providing power to satisfy electrical loads of the vehicle and, the operations comprising:
- determining, in a first determination operation, whether an amount of solar power, being output by the solar subsystem, is greater than a predetermined solar-power value;
- setting, if the amount of solar power is not greater than the predetermined solar power value, a solar DC-to-DC converter (solar DDC) to a sleep mode and returning to the first determining operation;
- initiating, if the amount of solar power is not greater than the predetermined solar power value and the vehicle is in a drive mode, a dark-drive mode comprising:
  - determining, in a second determination operation, an appropriate output voltage for the solar DDC; and
  - setting the solar DDC to effect output from the solar DDC to the AESS of the appropriate output voltage determined in order to charge the AESS to, or maintain a charge of the AESS at, a full level of the base portion;
- affecting, if the amount of solar power is greater than the predetermined solar-power value and the vehicle is not in the drive mode, the electrical system to maintain the AESS at full state-of-charge (SOC) by causing a maintenance charging current is provided to the AESS from the solar DDC; and
- initiating, if the amount of solar power is greater than the predetermined solar-power value and the vehicle is in the drive mode, a light-drive mode comprising:
  - determining, in a third determination operation, an appropriate output voltage for the solar DDC of the electrical system to be greater than a present setting of a high-voltage energy converter (HVEC) of the electrical system; and
  - setting the solar DDC to effect output from the solar DDC to the AESS of the appropriate output voltage determined in order to charge the AESS to, or maintain the charge of the AESS at, the full level of the base portion.

20. The non-transitory computer-readable storage device of claim 19, wherein the computer-executable instructions that, when executed by the processor, cause the processor to perform the light-drive mode, cause the processor to perform the operations further comprising:
- obtaining the present setting of the HVEC from the HVEC or a controller associated with the HVEC; and
- setting the solar DDC to maximize transfer of energy from the solar DDC to the electrical loads of the vehicle.

* * * * *